(12) United States Patent
Jenson

(10) Patent No.: US 12,299,708 B2
(45) Date of Patent: *May 13, 2025

(54) EVALUATION OF COMPLETION DATA EVIDENCING COMPLETION OF A TASK AGAINST OPPORTUNITY COMPLETION CRITERIA BEFORE PROVIDING AN AUTHENTICATED USER A REWARD

(71) Applicant: Peter Jenson, Florence, OR (US)

(72) Inventor: Peter Jenson, Florence, OR (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/216,794

(22) Filed: Jun. 30, 2023

(65) Prior Publication Data

US 2023/0342807 A1    Oct. 26, 2023

Related U.S. Application Data

(63) Continuation of application No. 17/316,744, filed on May 11, 2021, now Pat. No. 11,727,429, which is a continuation of application No. 16/383,099, filed on Apr. 12, 2019, now Pat. No. 11,037,185, which is a continuation of application No. 15/096,780, filed on Apr. 12, 2016, now Pat. No. 10,311,460.

(51) Int. Cl.
*G06Q 30/02* (2023.01)
*G06Q 30/0226* (2023.01)

(52) U.S. Cl.
CPC .............................. *G06Q 30/0226* (2013.01)

(58) Field of Classification Search
None
See application file for complete search history.

(56) References Cited

U.S. PATENT DOCUMENTS

| | | | | |
|---|---|---|---|---|
| 9,356,790 | B2* | 5/2016 | Zambetti | H04L 12/1813 |
| 2010/0280898 | A1* | 11/2010 | Kasuya | G06Q 30/02 |
| | | | | 705/14.33 |
| 2011/0071893 | A1* | 3/2011 | Malhotra | G06Q 10/109 |
| | | | | 709/225 |
| 2011/0112881 | A1* | 5/2011 | Malhotra | G06Q 10/1097 |
| | | | | 705/7.21 |
| 2011/0137716 | A1* | 6/2011 | Reuthe | G06Q 20/04 |
| | | | | 705/14.17 |

(Continued)

*Primary Examiner* — Sunit Pandya
(74) *Attorney, Agent, or Firm* — Peter J ensen-Haxel

(57) ABSTRACT

Disclosed is a method, a device, and/or a system of evaluation of completion data evidencing completion of a task against opportunity completion criteria before providing an authenticated user a reward. In one embodiment, a device includes an authentication module that authenticates a credential of a user associated with a user profile. The device includes instructions that when executed select an opportunity profile including an opportunity completion criteria for completion of a task and data specifying a reward, transmit the opportunity data to a computing device of the user over a network, receive a completion data generated upon completion of the task and generation of the completion data, and query the opportunity profile. A completion criteria engine then validates the completion data associated with the user profile ID by comparing the completion data to the opportunity completion criteria and provides the reward to the user.

20 Claims, 8 Drawing Sheets

GEOSPATIAL OPPORTUNITY
FEED PROCESS FLOW 850

(56) References Cited

U.S. PATENT DOCUMENTS

| | | | |
|---|---|---|---|
| 2012/0054000 A1* | 3/2012 | Boppert | G06Q 30/0207 |
| | | | 705/14.1 |
| 2012/0143952 A1* | 6/2012 | von Graf | G06Q 10/10 |
| | | | 709/204 |
| 2013/0030887 A1* | 1/2013 | Calman | G06Q 30/0226 |
| | | | 705/14.32 |
| 2014/0278850 A1* | 9/2014 | Boccuzzi, Jr. | G06Q 30/0208 |
| | | | 705/14.11 |

* cited by examiner

*FIG. 5* OPPORTUNITY FEED POPULATION PROCESS FLOW 550

FIG. 6  OPPORTUNITY DATA SELECTION PROCESS FLOW 650

OPPORTUNITY COMPLETION PROCESS FLOW 750

GEOSPATIAL OPPORTUNITY
FEED PROCESS FLOW 850

EVALUATION OF COMPLETION DATA EVIDENCING COMPLETION OF A TASK AGAINST OPPORTUNITY COMPLETION CRITERIA BEFORE PROVIDING AN AUTHENTICATED USER A REWARD

CLAIM FOR PRIORITY

This patent application claims priority from, and hereby incorporates by reference, U.S. patent application Ser. No. 17/316,744, filed May 11, 2021, titled 'VALIDATION OF OPPORTUNITY COMPLETION CRITERIA SUBMITTED BY AN AUTHENTICATED USER CLAIMING A REWARD UPON COMPLETING A TASK FROM AN OPPORTUNITY FEED' which claims priority to and here hereby incorporates by reference U.S. patent application Ser. No. 16/383,099, filed Apr. 12, 2019, titled 'USER ENGAGEMENT BASED ON A REVOLVING OPPORTUNITY FEED DELIVERING REWARDS OF A BUSINESS PROFILE BASED ON COMPLETION CRITERIA', which claims priority from and hereby incorporates by reference U.S. patent application Ser. No. 15/096,780, filed Apr. 12, 2016, titled 'A METHOD AND PROGRAM PRODUCT FOR LOYALTY REWARDS PROGRAMS'.

FIELD OF TECHNOLOGY

This disclosure relates generally to data processing devices and, more particularly, to a method, a device, and/or a system of evaluation of completion data evidencing completion of a task against opportunity completion criteria before providing an authenticated user a reward.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

A business may wish to encourage engagement from users (e.g., customers, potential customers, supporters and/or followers of the business's brand). The engagement, for example, may assist in advertising and marketing products and/or services, building brand awareness, building brand loyalty, launching and/or testing new products or services, and/or stimulating sales. One common strategy may include offering a reward to the user for some act of engagement that the business may care about (e.g., buying a certain product or service, taking an action reinforcing the brand of the business, etc.).

Some reward-based engagement methods may include offering coupons, loyalty points, special treatment or benefits, participation in contests, special currencies (e.g., that may even be transferrable between two or more businesses), and/or other perks. The reward may be obtained upon certain conditions, for example spending a certain amount of money at a business. Such reward-based engagement may occur at both physical locations (e.g., "brick-and-mortar" stores) and digital locations (e.g., "ecommerce"). Various technologies may be used to track and administer such methods, commonly databases for tracking users and keeping ledgers of rewards of the user.

However, there also may be challenges in reward-based engagement and the technologies that enable it. For example, it may be difficult to keep a user continually interested in new products and services. It may also be difficult to communicate with the user quickly and clearly. For example, it may be a challenge to present and organize information in a way that the user can review, compare, and process potential rewards. Some users may also "game the system" to try to earn rewards the business did not intend for them to earn. It such case, the reward generally does not help with engagement or otherwise benefit the business. For example, users may try to claim rewards that they are not eligible for, and they may undermine a business's ability to offer rewards and/or valuable rewards. As a result of one or more of these challenges, the business may not achieve good and/or maximal user engagement, which may result in a decline in sales, inadequate testing of new products and services, lower brand loyalty and awareness, and therefore overall less market share and/or revenue. There is a continuing need for new systems, devices, and/or methods that can assist a business in increasing reward-based customer engagement.

SUMMARY

Disclosed are a method, a device, and/or a system of evaluation of completion data evidencing completion of a task against opportunity completion criteria before providing an authenticated user a reward.

In one embodiment, a method includes authenticating a user associated with a user profile and/or a computing device associated with the user profile and receiving an opportunity request from the computing device associated with the user profile. The user profile includes a user profile ID, a reward balance, a reward status, an opportunity history and/or a past activity of the user. The method includes selecting an opportunity profile from which to transmit an opportunity data to the computing device. The opportunity profile includes an opportunity completion criteria and data specifying a reward for completion of the opportunity completion criteria.

The method extracts the opportunity data from the opportunity profile. The opportunity data includes an opportunity profile ID and/or the opportunity completion criteria. The method also includes transmitting the opportunity data to the computing device over a network, receiving a completion data and the opportunity profile ID, and validating the completion data by comparing the completion data to the opportunity completion criteria of the opportunity profile. It is determined that the completion data meets the opportunity completion criteria, and computer readable instructions are executed to provide the reward to the user.

The method may designate a completed instance of the opportunity data associated with the user profile ID. The method may modify the reward based on the reward status associated with the user profile. The opportunity data may be transmitted to the computing device over the network for display in an opportunity feed. The method may reference a feed population ruleset to determine an addition to the opportunity feed based on a date, an activity history of the user, and/or a geospatial location of the computing device.

The completion data may include a transaction data generated by a transaction between the user associated with the user profile and a second user associated with a second user profile. The opportunity profile selected may be associated with a business profile, the second user may be a business user, and the second user profile may be the business profile.

The method may include receiving a geospatial coordinate from the computing device associated with the user profile and determining, based on the geospatial coordinate, the computing device associated with the user profile has moved from a first geospatial area to a second geospatial area. One or more instances of the opportunity data may be stored in the opportunity feed as a saved feed, and one or more new instances of the opportunity data may be added to the opportunity feed based on movement into the second geospatial area.

The method may include determining that the computing device associated with the user profile has moved back into the first geospatial area, and restoring the opportunity feed from the saved feed. The reward may include a point usable in association with a different transaction between the user profile and the business profile, a credit spendable at cash value, a physical currency, a digital currency, a credit usable in association with the different transaction between the user profile and the business profile, a token usable to modify a pending instance of the opportunity data in the opportunity feed for the user to achieve a higher reward status, and/or a discount on a product and/or a service.

The computer readable instructions may be executed to provide the reward to the user including steps of referencing the reward in the opportunity profile and associating the reward with the user profile. The transaction may be a social media transaction, a purchase transaction, and/or a marketing transaction. The opportunity profile may be selected based on criteria that may include a random process, the past activity of the user, the opportunity history, and/or a purchase data of the user profile. The reward may further include a voucher, a coupon, a free product, and/or a free service. The business profile may include a name, a geospatial location associated with the business profile, a category of a business associated with the business profile, and/or a business data.

In another embodiment, a device includes a processor, a memory, an authentication module, a set of computer readable instructions, and a completion criteria engine. The authentication module includes computer readable instructions that when executed on the processor authenticate a credential of a user associated with a user profile and/or a computing device associated with the user. The set of computer readable instructions, when executed on the processor, select an opportunity profile from which to transmit an opportunity data to the computing device and transmit the opportunity data to the computing device over a network for display on the computing device of the user. The opportunity profile may include an opportunity profile ID, an opportunity completion criteria for completion of one or more tasks, and data specifying a reward for completion of the opportunity completion criteria.

The set of computer readable instructions, when executed on the processor, also receive a completion data that includes a user profile ID and the opportunity profile ID, query the opportunity profile, and extract the opportunity completion criteria. The completion data may be generated upon completion of the one or more tasks.

The completion criteria engine includes computer readable instructions that when executed on the processor validate the completion data associated with the user profile ID, by comparing the completion data to the opportunity completion criteria, and then provide the reward to the user.

In yet another embodiment, a system includes a server and a network. The server includes a processor of the server, an opportunity profile, an authentication module, a selection algorithm, a memory of the server, and a completion criteria engine. The opportunity profile includes an opportunity profile ID, an opportunity completion criteria, and a reward for completion of the opportunity completion criteria. The authentication module includes computer readable instructions that when executed on the processor authenticate a user and/or a computing device associated with a user profile of the user. The selection algorithm includes computer readable instructions that when executed on the processor of the server determine an opportunity data of the opportunity profile to transmit to the computing device.

The memory of the server includes computer readable instructions that when executed on the processor extract the opportunity data that includes the opportunity completion criteria and the reward from the opportunity profile, and transmit the opportunity data to the computing device associated with the user profile for display on the computing device.

The completion criteria engine includes computer readable instructions that when executed on the processor of the server validate a completion data associated with a user profile ID by comparing the completion data to the opportunity completion criteria of the opportunity profile. The completion criteria engine also includes computer readable instructions that provide the reward to the user. The system may also include a different computing device associated with a business profile and/or a POS system.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
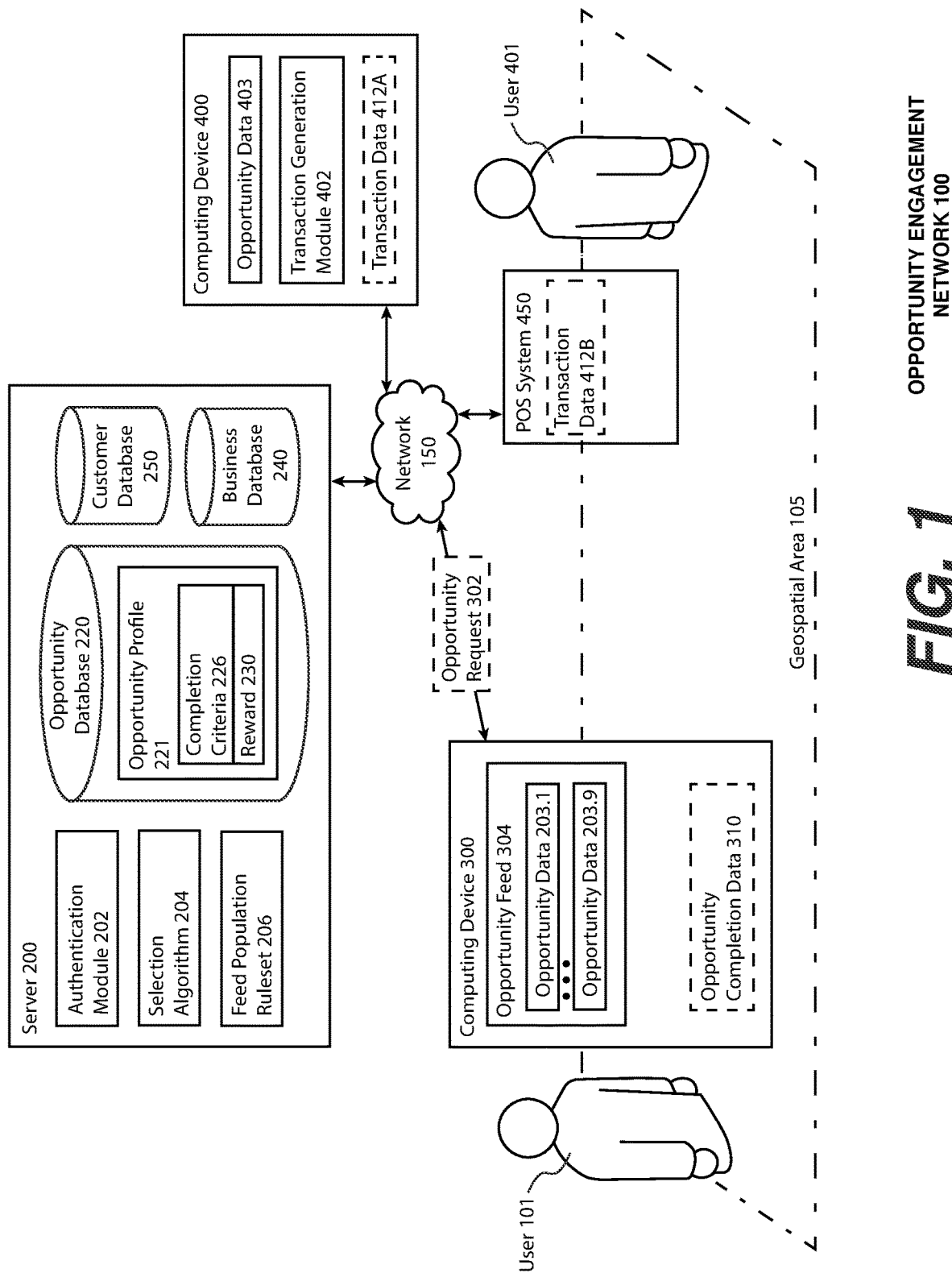
FIG. 1 illustrates an opportunity engagement network for engaging a first user who may be a consumer in one or more opportunities offered by a business generated on a server and presented in an opportunity feed on a computing device of the first user, according to one or more embodiments.

Other features of the present embodiments will be apparent from the accompanying drawings and from the detailed description that follows.

DETAILED DESCRIPTION

Disclosed is a method, a device, a system, and/or a manufacture of evaluation of completion data evidencing completion of a task against opportunity completion criteria before providing an authenticated user a reward. The present invention is best understood by reference to the detailed figures and description set forth herein. One or more of the present embodiments, and variations thereof, provide for digitally-based marketing and a customer incentive platform that allows customers of businesses to earn rewards by completing tasks and making purchases at participating businesses. In one or more embodiments, using a website or a mobile application, consumers (e.g., the user 101) may sign up for customer accounts and business owners or managers and/or other representatives (e.g., the user 401) may sign up for business accounts. The customer account may be referred to as a user profile 251 and the business account may be referred to as the business profile 241. In one or more embodiments, among the rewards 230 the customer may be able to earn are a point 231, a token 232, a credits 233, and/or a bonus point 234. The point 231 may be spendable, at consistent cash-value, at any participating business in the network. Points 231 may be earned whenever the user 101 makes an eligible purchase at a participating business with an active business profile 241. In one or more embodiments, the number of points 231 earned by completing an opportunity may be influenced by the value of the transaction. The transaction may generate a transaction data 212 and/or a transaction data 412. The opportunity engagement network 100 comprises an opportunity feed 304, which in one or more embodiments may be referred to as a "Hot List". The opportunity profile 304 presents opportunities to the user 101 as the opportunity data 203, which may direct the users 101 to specific businesses (e.g., a location 225 of the opportunity profile 221, which may be the same or nearby a location 245 of the business profile 241) by offering a reward 230. The reward 230 may include, but is not limited to, increased discounts at businesses and a token 232 that may be used in future transactions that may increase the number of points 231 earned for a single transaction (e.g., by paying a modification cost 229 of the opportunity profile 221).

In one or more embodiments, the reward 230 may include, without limitation, a higher rewards rate or enhanced reward status 256, progress made towards a higher rewards rate or enhanced reward status 256 that may be effective throughout the entirety of the next set time period such as, without limitation, the next month, free items or services such as, without limitation, those that might be offered by businesses as promotions, and/or a combination of rewards.

FIG. 1 is an opportunity engagement network 100 for engaging a first user 101 who may be a consumer in one or more opportunities of a business generated on a server 200 (embodied in the opportunity data 203) and presented in an opportunity feed 304 on a computing device 300 of the first user 101, according to one or more embodiments. In the embodiment of FIG. 1, a user 401 (e.g., a representative of a business) with a business profile 241 defines an opportunity associated with the business profile 241 as the opportunity data 403. The opportunity data 403 is transmitted to the server 200 and may be parsed such that some or all of the opportunity data 403 is stored as an opportunity profile 221, the opportunity profile 221 representing an "opportunity" which may be presented to a user 101.

In a non-limiting example, the opportunity as specified in an opportunity profile 221 and extracted into the opportunity data 203 for delivery and display by an application that may include, but is not limited to, making a purchase at a specific business, creating an account on a website, buying a specific product at a specific business, making a purchase at any business that the user 101 has not made a purchase at previously or recently over some time period, physically visiting the location of a business, accomplishing specific actions on social media (e.g., Twitter®, Facebook®, Instagram®), spending at least a certain amount of money within a specified time period, etc.

The user 101 is associated with a computing device 300. The user 101, for example, may be a customer of the business, a potential customer of the business, and/or a consumer. The computing device 300 may be a mobile device such as a smartphone, a tablet device, a desktop device, a wearable device such as a smartwatch, etc. The computing device 300 comprises an application (e.g., a mobile app). The application generates an opportunity request 302 for one or more opportunities that the user 101 may try to complete for a reward 230 and/or receives an opportunity served to the computing device 300.

The computing device 300 generates the opportunity request 302 for delivery of an opportunity data 203 to then be presented to the user 101 in the opportunity feed 304. The opportunity request 302 may be generated, for example, because the user 101 began using the opportunity engagement network 100, because the user 101 just completed one or more opportunities, and/or other reasons. In one or more other embodiments the server 200 serves without the opportunity request 302 initiated by the computing device 300. Completion of the opportunity may generate an open slot 303 in the opportunity feed 304, in such case the user interface presents an empty slot where an opportunity data 203 may ordinarily be presented, as shown and described in FIG. 3. The opportunity request 302 is transmitted through the network 150 to the server 200. The network 150 may be, for example, a local area network, a wide area network, and/or the Internet.

The server 200 receives the opportunity request 302 over the network 150. The user 101 and/or the computing device 300 may be authenticated by the authentication module 202, including determining a user profile 251 of the user 101 associated with the computing device 300 generating the opportunity request 302, as shown and described in conjunction with FIG. 2. The server 200 comprises an opportunity database 220 comprising one or more opportunity profiles 221 which may each have an associated reward 230 for completion, a customer database 250 comprising one or more user profiles 251, and a business database 240 comprising one or more business profiles 241.

Upon receipt of the opportunity request 302 or if initiating serving an opportunity to the computing device 300, a feed population ruleset 204 determines a replacement of an open slot 303 in the opportunity feed 304, and/or an addition to the opportunity feed 304, based on a re-population condition. The repopulation condition is further described throughout this specification, but for example may be based on the user 101 completing a threshold number of the opportunity data 203 in the opportunity feed 304 (e.g., the user 101 completed the completion criteria 226 for six out of ten instances of the opportunity data 203 in the opportunity feed 304 within a given period of time). If the repopulation condition is met, the server 200 determines one or more opportunity data 304 that are to be returned to the computing device 300. In one or more embodiments, open slots 303 may be replaced with the new opportunity data 203 at an end of a determined time period. In one or more embodiments, all instances of the opportunity data 203 and open slots 303 on a the opportunity feed 304 may be replaced with new instances of the opportunity data 203 at regular intervals. In a non-limiting example, this might occur on the $1^{st}$ day of each month. Thus, in one or more embodiments, the process of serving, completing, and replacing instances of the opportunity data 203 within the opportunity feed 304 may be referred to as a "revolving" process.

A selection algorithm 206 determines an opportunity profile 221 from which to extract the opportunity data 203 to transmit to the computing device 300 as the opportunity data 203. The selection algorithm 206 may select the opportunity profile 221 based on a number of factors shown and described herein. The opportunity data 203 may be selected by various criteria such as, but not limited to, a past activity of the user 101 (e.g., the opportunity history 254) and/or randomization. In another example, the selection may be based on a geospatial location of the computing device 300. For example, where the computing device 300 transmits a geospatial coordinate that is determined to be within the geospatial area 105 (e.g., a downtown area), the selection algorithm 206 may transmit an opportunity data 203 with a location 225 within the geospatial area 105 (e.g., a restaurant in the downtown area). The server 200 may then transmit the opportunity data 203 to the computing device 300 over the network 150, which may be received by the application and displayed in the opportunity feed 304 (e.g., to fill the open slot 303) and/or to add to a sequential list of opportunity data 203.

Figure 2:
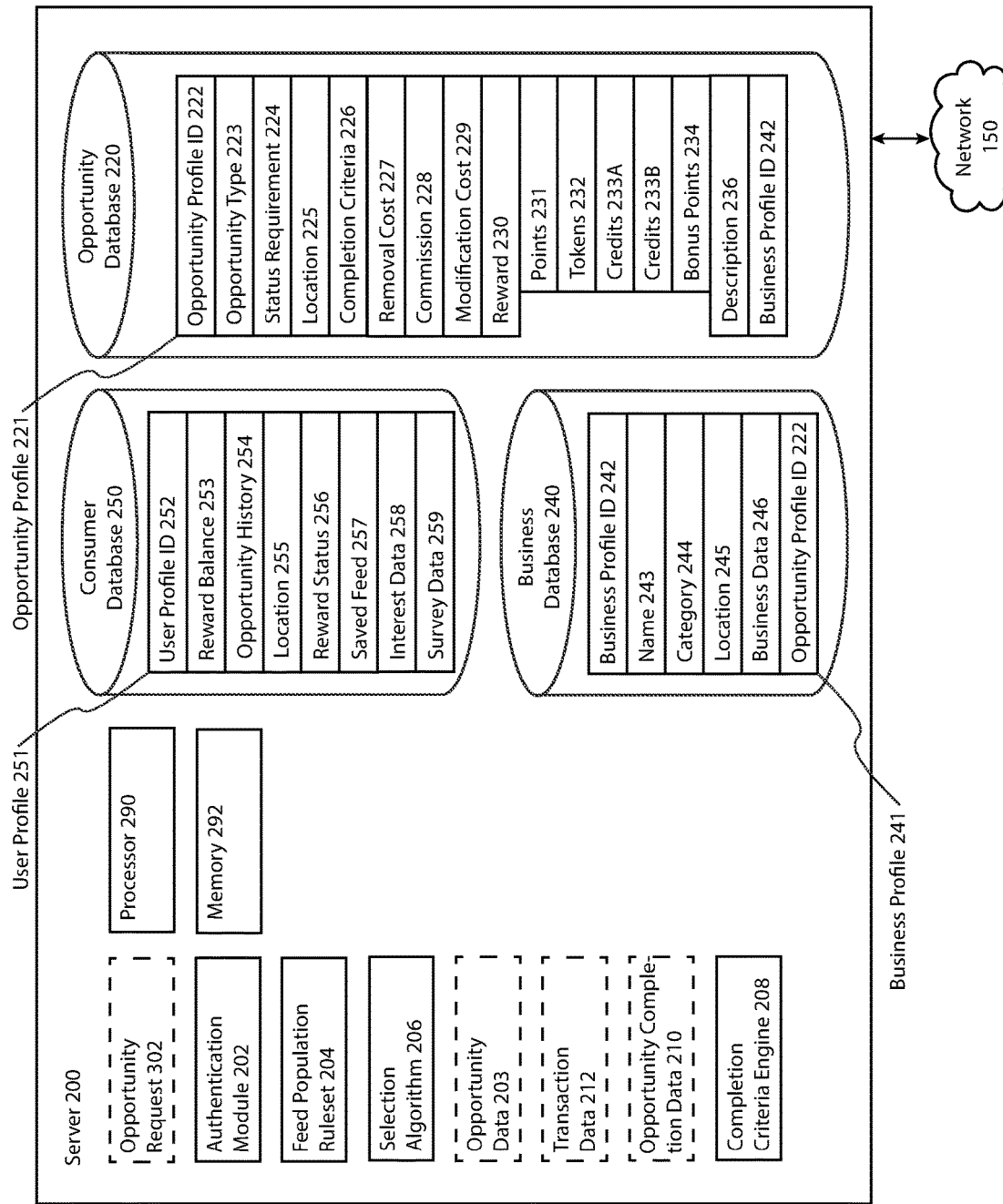
FIG. 2 illustrates the server of FIG. 1 including an opportunity database, a consumer database, and a business database, the server comprising a feed population ruleset for determining when to serve an opportunity data, a selection algorithm for selecting the opportunity data, and a completion criteria engine for determining completion of the opportunity to provide the reward to the first user, according to one or more embodiments.
Figure 3:
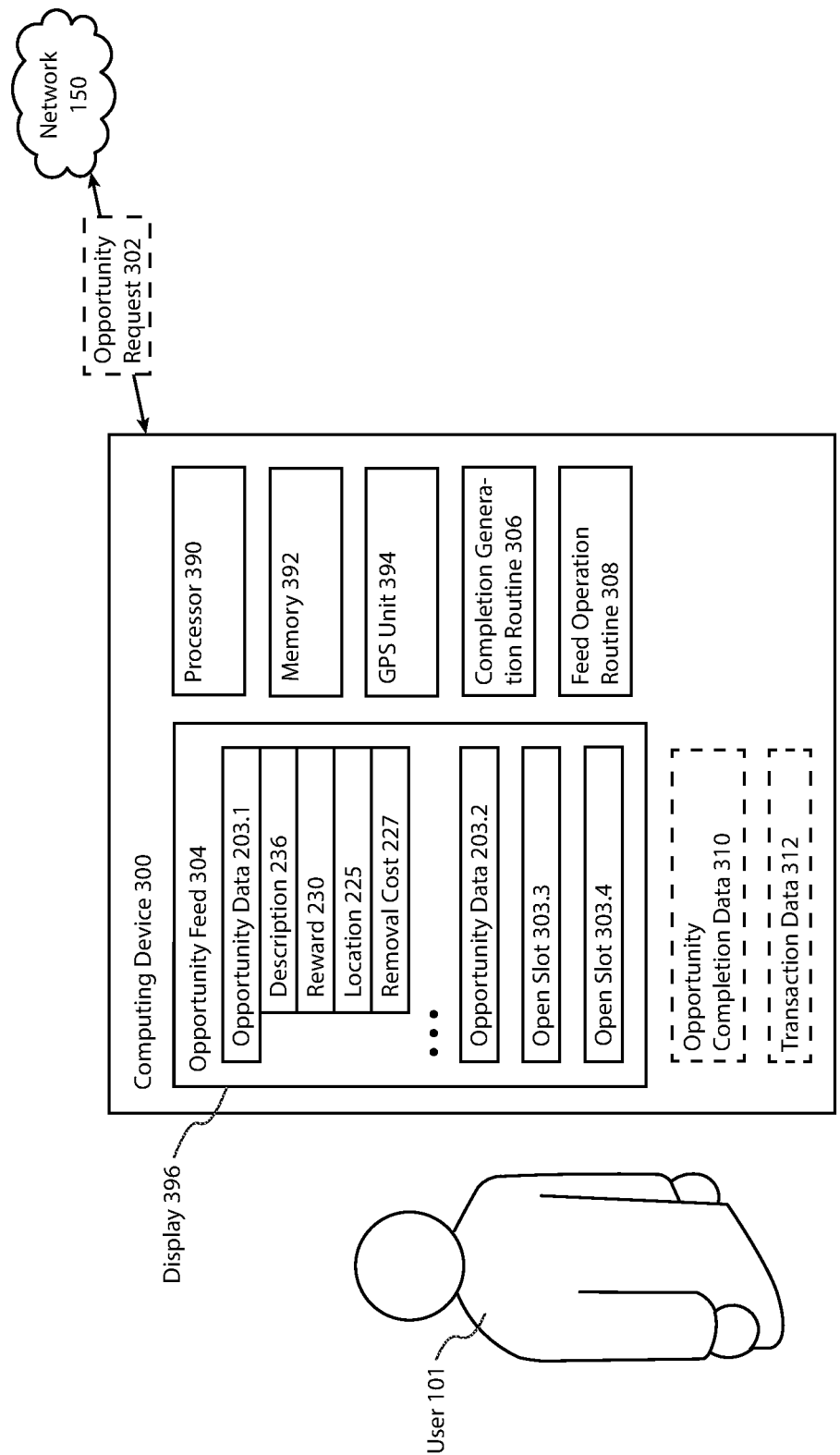
FIG. 3 illustrates the computing device of the first user, for example a mobile device, that may generate the opportunity request and/or receive an opportunity served and initiated by the server of FIG. 2, present the opportunity data in an opportunity feed, and generate an opportunity completion criteria for transmission to the server, according to one or more embodiments.

As further shown and described in FIG. 2 and FIG. 3, the user 101 may review a description 236 of the opportunity including completion criteria 226, the reward 230 of the opportunity, a location 225 of the opportunity (if any), and one or more other aspects. The user 101 may then decide whether he or she wishes to try to complete the opportunity associated with the opportunity profile 221 and presented as the opportunity data 203. For example, the completion criteria 226 may engage in a purchase transaction of at least five dollars ($5) at a business.

The user 101 may then attempt to "complete" the opportunity by meeting the completion criteria 226. Continuing with the example, the user 101 may navigate to the restaurant at the location 225 and purchase an appetizer for seven dollars ($7). In one or more embodiments, the task may involve a transaction between the user 101 and the business, e.g., a transaction between the user profile 251 and the business profile 241. For example, a computing device 400 of the business and/or a POS System 450 of the business may process a transaction data 412. Where separate systems, the computing device 400 and the POS system 450 may generate a transaction data 412A and a transaction data 412B, respectively, that comprises data evidencing the purchase transaction. The computing device 400 and the POS system 450 are further shown and described in conjunction with FIG. 4.

Following apparent completion of the opportunity, the computing device 300 and/or other computing devices may generate the opportunity completion data 310. For example, the opportunity completion data 310 may include details of the transaction between the user 101 and the business including but not limited to the transaction data 212. The opportunity completion data 310 is communicated over the network 150 to the server 200 where it is assessed against the completion criteria 226 of the opportunity profile 221. If completion is successfully determined, the reward 230 is associated with the user profile 251 of the user 101. The user 101 may then spend the reward 230 (e.g., the points 231, the tokens 232, the credits 233, and/or other rewards such as a discount on a product and/or a service) at a plurality of businesses participating in the opportunity engagement network 100 and/or interacting with the opportunity engagement network 100 as shown and described throughout. The computing device 300 may continue to generate instances of the opportunity request 302 and continue to present opportunity data 203 in the opportunity feed 304.

The opportunity engagement network 100 may include a plurality of users 101 (e.g., customers of businesses), and a plurality of businesses (e.g., which may control the computing device 400 and the POS system 450, and may be associated with the user 401). The opportunity engagement network 100 provides a digital rewards program through which the users 101 may earn points by making purchases and/or engaging in other transactions. Points 231 may be earned by users 101 after purchases and/or other transactions and in one or more embodiments can be redeemed at any of a plurality of participating businesses in the opportunity engagement network 100 in place of cash. The number of points 231 earned for a given transaction may be affected by the purchase price of a good or service. The opportunity engagement network 100 includes, but is not limited to, an electronic app-based rewards system that in one or more embodiments may not be reliant on physical rewards cards and may allow customers (e.g., the user 101) to use the computing device 300 (such as, but not limited to, smartphone, tablet, etc.) to make purchases through the application or record/confirm that payments occurred while earning rewards 230 for those purchases. In one or more embodiments, the user 101 may earn rewards at a first business (e.g., rewards 230 from completing the opportunity of an opportunity profile 221 associated with the first business) and spend them at any other business in the opportunity engagement network 100 (to purchase a product at a second business). The user 101 may have an option of inputting payment information such as, but not limited to, credit/debit cards, bank account, etc. into their user profile 251 so that the user 101 may pay at participating businesses using a payment processing system that may be integrated with the opportunity engagement network 100 and/or operated by the server 200. The user 101 may also use the application on the computing device 300 to identify businesses (e.g., retail stores, restaurants) participating in the opportunity engagement network 100, for example through various methods such as, but not limited to, a name search, a store ID search (e.g., a business profile ID and/or a store ID of a store associated with the business profile ID), a geospatial location, etc. The user 101 may be able to browse individual profiles for each business (e.g., the business profile 241) listed to learn information about that business such as, but not limited to, a name 243, a category 244, and business data 246 which may include a description, picture, a menu, contact information, hours of operation, etc. The user 101 may make payments for a transaction with a business through the application using the payment method of the user 101's choice, such as, but not limited to, a credit card, a bank transfer, the points 231, the credits 233, etc. In one or more embodiments, the user 101 may use the POS system 450 which may be at a location of a business to make a purchase and use the application on the computing device 300 to record the transaction as the transaction data 212, the transaction data 312, and/or the transaction data 412. The server 200 may store activity of the user 101, for example in an opportunity history 254 of the user profile 251 and/or as a purchase history. In one or more embodiments, the user 101 may earn points 231 by making purchases at participating businesses, with the exception of transactions that are entirely paid for using points 231 and/or other instances of the reward 230. As a non-limiting example, a user 101 may receive points 231 if they complete a purchase transaction with a credit card, but not if a price of the purchase transaction is paid for using the points 231 that the user 101 previously earned. In one or more embodiments, the user 101 may receive points 231 for a cash portion of the transaction that exceeds a value of points 231 used. In the present embodiment, the computing device 400 may be able to access electronic records on server 200 of transactions of the business that have occurred through opportunity engagement network 100, which may be stored as an opportunity history 254 of the business profile 241 and stored in association with the business profile 241. In one or more alternate embodiments, the POS system 450 and/or another networked terminal (e.g., the computing device 400) may have real time access to server 200 where the user 401 associated with the business may approve a current transaction of the user 101, for example by presenting the user 101 with a proposed instance of the transaction data 412 for conformation and/or approval by the user 101. The business may then be able to receive payment through the application in the form of, but not limited to, a bank transfer to the business account of the business and/or a physical check.

In one or more embodiments, the rewards rate or reward status 256 may be incrementally increased for each opportunity data 203 completed within a determined time period. In one or more embodiments, tokens 232 may be used to achieve a higher rewards rate or enhanced reward status 256 for a limited number of future transactions, the number of which is determined by the number of tokens 232 possessed by the user 101. In a non-limiting example, if a customer has one token 232 associated with the user profile 251 of the user 101, the user 101 might be able to spend the token 232 to increase their rewards rate or reward status 256 for a single transaction, at which point the token 232 may be permanently consumed.

In one or more embodiments, the reward 230 may be beneficial to the user 101 independently of whether or not the completion of one or more tasks of the opportunity profile 221 itself was an enjoyable and/or a beneficial experience for the user 101. As a non-limiting example, the user 101 may still benefit from having completed an opportunity even if the completion of the one or more tasks resulted in the user 101 buying a lunch they did not enjoy at a restaurant (e.g., a business profile 251 associated with a business that is a restaurant). In one or more embodiments, completion of an opportunity data 203 may be viewed as a form of "payment" or consideration that the user 101 made in order to obtain the associated reward 230. In one or more embodiments, the opportunity feed 304 may also use additional rewards 230 to incentivize a user 101 to perform specific tasks (e.g., a type of financial transaction between the user profile 251 and the business profile 241) that may not require purchases and/or financial transactions with businesses participating in the opportunity engagement network 100. For example, a task not including a financial transaction may include, but is not limited to, "checking in" with a location 255 of the computing device 300 of the user 101. The location 255 may be generated via GPS at a particular location. In another example, a task of the opportunity profile 221 may require the user 101 to sign up for a website, an email list, to receive marketing materials, and/or post a comment on a forum over the network 150.

In one or more embodiments, the user 101 may have the ability to remove an opportunity data 203 from the opportunity feed 304 by accomplishing a primary task of an opportunity data 203 and/or through alternative means. In a non-limiting example, the customer may visit a location 225 of an opportunity data 203 and/or a location 245 of a business and make a five dollar ($5) minimum purchase to complete the opportunity data 203. The one or more acts and/or tasks required to complete the opportunity of the opportunity profile 221 are referred to herein as the completion criteria 226.

In one or more embodiments, and variations thereof, users 101 (e.g., customers of businesses) may enter data on an application (e.g., running on the computing device 300) or website to set up the user profile 251. In one or more embodiments, the user 101 may make payments to a business through the application and/or receive points 231 that are spendable in lieu of cash at businesses participating in the opportunity engagement network 100. In one or more embodiments, the users 101 (e.g., customers) may use the application to confirm transactions that were made through a point-of-sale system 450 associated with a business profile 241. In a non-limiting example, the user 101 may pay with physical currency rather than use an electronic form of payment processed through the POS system 450. The user profile 251 may be stored in a consumer database 250 on the server 200. The user profile 251 is further shown and described in conjunction with FIG. 2.

In one or more embodiments, and variations thereof, businesses may enter data (e.g., through a website) sufficient to create the business profile 241. In one or more embodiments, users 401 associated with multiple business locations (e.g., a location 245A of the business profile 241, a location 245B of the business profile 241) and/or even associated with multiple businesses (e.g., a business profile 241A, a business profile 241B) may be able to use a single master account to manage all of them (not shown in the accompanying figures). In one or more embodiments, a business may enter information about their business, such as, but not limited to, a name 243, a location 245, and a category 244 (e.g., a restaurant, an apparel store, a game store, and/or sub categories such as Indian food, Mexican food, a lighting store, a shoe store, etc.). In one or more embodiments, a business may enter in bank account information to facilitate the transfer of funds from customers (e.g., the user 101) purchasing goods and services of the business. In one or more embodiments, businesses may enter in various forms of payment information to facilitate the process of billing the user 101 for transactions that were confirmed in the application (e.g., running on the computing device 300), but not paid through the application, such as, without limitation, physical currency. The business profile 241 may be stored in a business database 240 on the server 200. The business profile 241 is further shown and described in conjunction with FIG. 2.

FIG. 2 illustrates the server of FIG. 1 including an opportunity database 220, a consumer database 250, and a business database 240, the server 200 comprising a feed population ruleset 204 for determining when to serve an opportunity data 203, a selection algorithm 206 for selecting the opportunity data 203, and a completion criteria engine 208 for determining completion of the opportunity to provide the reward 230 to a user 101, according to one or more embodiments.

A user profile 251 stored in a customer database 250 may include, but is not limited to, a user profile ID 252, a reward balance 253, an opportunity history 254, a reward status 256, a saved feed 257, an interest data 258, a survey data 259, and/or a location 255. The user profile ID 252 is a unique identifier to distinguish the user profile 251 from other user profiles 251 within the customer database 250. A reward balance 253 comprises current rewards associated with the user profile 251, including without limitation the points 231, the tokens 232, and/or the credits 233 earned by the user 101 associated with the user profile 251. In one or more embodiments, the credits 233 may be spendable in lieu of cash and at cash-value, but only at a specific business (e.g., in association with a specific business profile 241). Therefore, a user profile 251 may hold credits 233 associated with multiple businesses (e.g., the user 101 may have stored on their instance of the user profile 251 fifteen dollars ($15) in credits 233A at a first business, and ten dollars ($10) in credits 233B at a second business). In one or more embodiments, the user 101 may input authentication information such as a personal identification number (PIN) and/or a password. In one or more embodiments, the customer may enter payment information such as, but not limited to, credit/debit cards, bank account, points, or other payment method such as digital currency, etc. into the user profile 251 so that they may pay at businesses.

The rewards status 256 may determine a quantity and/or a quality of the rewards 230 that the user profile 251 may be able to earn when engaging in transactions and/or completing opportunities. The rewards status 256 may change based on activity associated with user profile 251, such as, without limitation, the completion of opportunities in the opportunity feed 304. In a non-limiting example, completing two out of ten opportunities (e.g., presented as the opportunity data 203.1 and the opportunity data 203.2) in the opportunity feed 304 may result in the rewards status 256 of the user profile 251 updating from a first value to a second value (e.g., changing from "Bronze" to "Silver"). A high reward status 256 may allow the user profile 251 to receive an increased quantity, earnings rate, and/or quality of rewards 230 associated with the "Silver" status. For example, a starting tier may multiply one or more of the rewards 230 by 1.0, whereas an elevated tier may multiply one or more of the rewards 230 by 1.1 (e.g., one hundred and ten percent (110%) of the points 231 earned compared to the starting tier).

The opportunity history 254 comprises a history of the interactions of the user profile 251 with one or more opportunities (e.g., opportunities for which the completion criteria 226 was met, opportunities for which the completion criteria 226 was not met, opportunities which were transmitted as the opportunity data 203 to the computing device 300, opportunities which the user 101 removed from the opportunity feed 304, etc.). The opportunity history 254 may identify an opportunity by the opportunity profile ID 222. In one or more embodiments, the completion criteria engine 208 may comprise computer readable instructions may designate a completed instance of the opportunity data 203 associated with the user profile ID 251 in the opportunity history 254. The saved feed 257 comprises one or more opportunity data, as may be identified by the opportunity profile ID 222, that were in the opportunity feed 304 of the computing device 300 at a given time. For example, as shown and described in conjunction with FIG. 8, upon detection of the computing device 300 moving from a first geospatial area 105A to a second geospatial area 105B, a state of the opportunity feed 304 may be saved and stored as the opportunity history 254 to be used in re-populating the opportunity feed if the computing device 300 re-enters the first geospatial area 105A. The location 255 may include a permanent location associated with the user 101, historical geospatial data of the user 101 (e.g., via the computing device 300) and/or a current geospatial location of the computing device 300.

The interest data 258 comprises data about interests of the user 101. For example, the interest data 258 may be interests extracted from the survey data 259 that may include topics, categories of goods and services, products, events, and other types of information which the user is interested in. The interest data 258 may also be data inferred from other data, for example the opportunity history 254 (e.g., opportunities the user 101 responded to and/or responded quickly to), purchase history of purchase transactions, or an opportunity data 203 the user 101 has expressed interest in. The survey data 259 comprises information generated by presenting the user 101 of the user profile 251 with a questionnaire or survey about their likes, dislikes, interests, values, favorite goods or services, personality, and/or other personal aspects. The interest data 258 and/or the survey data 259 may form one of the bases for selection by the selection algorithm 206.

An opportunity database 220 comprises instances of the opportunity profile 221 which may each represent an opportunity and may be set up by a business associated with a business profile 241. The opportunity profile 221 may comprise a number of attributes as shown in FIG. 2. An opportunity profile ID 222 distinguishes an instance of the opportunity profile 221 from other instances of the opportunity profile 221 within the opportunity database 220. The opportunity profile 221 may include an opportunity type 223 specifying a type of opportunity, for example, a purchase task, a signup task (e.g. to sign up to receive communications of a business), a website visit task, or a social media interaction (e.g., posting a message on a social media account of the business). The opportunity profile 221 may include a status requirement 224 that may specify which instance of the reward 230 may be available for completing the opportunity depending on the reward status 256 of the user profile 251 completing the opportunity. The completion criteria 226 comprises one or more requirements for completing the opportunity and earning the reward 230 (e.g., engage in a transaction with the business profile 241, post on a social media page associated with the business profile 241, physically go to a geospatial location with the computing device 300 and "check in" on a social media account, etc.).

A location 225 of the opportunity profile 221 comprises data of one or more geospatial locations associated with the opportunity. The location 225 may or may not be a basis of the completion criteria 226. In one or more embodiments, the location 225 may be a location of a business (e.g., the same or similar to the location 245 of the business profile 241). The business profile ID 242 comprises one or more unique identifiers of the business profile 241, for example the business profile 241 of the business generating the opportunity profile 221 and/or offering the opportunity. The removal cost 227 may be a cost the user 101 may pay (e.g., by deducting tokens 232 from the reward balance 253 of the user profile 251 of the user 101) to remove the opportunity data 203 of the opportunity profile 221 from the opportunity feed 304. However, in one or more embodiments no removal cost 227 is used or specified for the opportunity profile 221. A commission 228 may be data specifying a payment and/or transaction fee to be paid for the service of providing the opportunity engagement network 100 and/or paid to an operator of the server 200. The reward 230 specifies a reward provided for completing the opportunity by meeting the completion criteria 226. As described throughout this specification, the reward 230 may include but is not limited to points 231, tokens 232, credits 233 (which may be associated with a particular instance of the business profile 241), and bonus points 234. The reward 230 may also be a discount on a product and/or a service. A modification cost 229 comprises a cost (e.g., in cash, in points 231, in tokens 232) that may be used to modify the opportunity, for example to temporarily lower the status requirement 224 so the user 101 may earn rewards 230 as if the user 101 had already achieved a higher reward status 256. A description 236 comprises a description of the opportunity to help the user 101 understand the opportunity, for example including information about the business, menu of a restaurant, a location, a description of the completion criteria 226, and/or marketing material.

The server 200 may include a business database 240 comprising one or more business profiles 241. The business profile 241 may include a business profile ID 242, one or more locations 245 associated with the business, a category 244 (e.g., a restaurant, a clothing store), and a business data 246 that may include information about the business (e.g., hours of operation, mission statement, description of goods and services, etc.). The business profile 241 may include references to one or more opportunity profiles 221 that the business profile 241 that a user 401 associated with the business profile 241 set up.

In the embodiment of FIG. 2, multiple data and computer readable instructions may be employed to effect the processes of the opportunity engagement network 100, which will now be described. The server 200 may include a processor 290 and a memory 292. The opportunity request 302 is a request and/or notification sent from the computing device 300 over the network 150 requesting an opportunity to be served to the computing device 300 in the form of an opportunity data 203 extracted from an opportunity profile 221. An authentication module 202 comprises computer readable instructions that when executed on the processor 290 authenticates a credential of the user 101 and/or the computing device 300 (e.g., a PIN, a password), which may occur before, during, or after receipt of the opportunity request 302. A feed population ruleset 204 determines an addition to the opportunity feed 304 based on a repopulation condition and/or a replacement of an open slot 303 in the opportunity feed 304 based on a repopulation condition. A selection algorithm 206 selects the opportunity profile 221 based on one or more factors. The operation of the feed population ruleset 204 and the selection algorithm 206 are described throughout the present embodiments. The opportunity data 203 comprises all or a portion of the opportunity profile 221 extracted from the opportunity database 220 for transmission to and display on the computing device 300. The transaction data 312 may be data generated by the server 200 specifying details of a transaction between the user profile 251 and the business profile 241. For example, the transaction data 312 may specify data of a purchase transaction, a financial transaction, a social media transaction, and/or a marketing transaction. Associated transaction data 212 may also be generated by the computing device 300, and an associated transaction data 412 may be generated by the computing device 400 and/or the POS system 450, as shown and described in conjunction with FIG. 4. An opportunity completion data 310 is data communicating that the completion criteria 226 has been met, and may be submitted with the transaction data 412 over the network 150.

The completion criteria engine 208 comprises computer readable instructions that when executed on the processor 290 of the server 200 validates an opportunity completion data 310 associated with a user profile ID 251 by comparing the opportunity completion data 310 to an opportunity completion criteria 226 of the opportunity profile 221. The completion criteria engine 208 then references a reward 230 in the opportunity profile 221, designates a completed instance of the opportunity data 203 associated with the user profile ID 251 (e.g., in the opportunity feed 304, in the opportunity history 254), and associates the reward 230 with the user profile 251 (e.g., adds points 231 to the reward balance 253 of the user profile 251). In one or more embodiments, the completion criteria engine 208 may comprise computer readable instructions that may designate a completed instance of the opportunity data 203 associated with the user profile ID 251 in the opportunity history 254.

FIG. 3 illustrates the computing device 300 of a user 101 that may generate the opportunity request 302, present the opportunity data 203 in an opportunity feed 304, and generate an opportunity completion criteria 310 for transmission to the server 200, according to one or more embodiments. The computing device 300 may include a processor 390, a memory 392, and a GPS unit 394 that may detect and log geospatial position by recording geospatial coordinates.

The computing device 300 comprises an application (as described in this specification, although not shown in the embodiment of FIG. 3) that presents the opportunity feed 304 to the user 101 on a display 396 of the computing device 300. Each item of the opportunity feed 304 may be denoted with a trailing decimal and number (e.g., "0.1" through "0.10" for ten items). The opportunity data 203 may include data extracted from the opportunity profile 221, for example a description 236, a reward 230, and/or a location 225. In another example, the opportunity data 203 may include the description 236, the reward 230, and the removal cost 227. The opportunity data 203 may include other data as may be relevant to completing the opportunity and/or evaluating its benefit to the user 101, for example the modification cost 229. The description 236 may include a human-readable description of the completion criteria 226. In the embodiment of FIG. 3, the opportunity feed 304 is illustrated with an open slot 303.3 and an open slot 303.4, which may have been generated by meeting the completion criteria 226 and/or through a removal action by the user 101, as described below.

The computing device 300 comprises a completion generation routine 306 that comprises computer readable instructions that when executed on the processor 390 of the computing device 300 generates the opportunity completion data 310. The opportunity completion data 310 may comprise an opportunity profile ID 222 specifying the opportunity for which the user 101 is eligible to receive the reward 230. Although not shown in the embodiment of FIG. 3, a transaction generation module may generate the transaction data 312 comprising data and/or details about the transaction between the user profile 251 and the business profile 241. The transaction data 312 may be submitted along with the opportunity completion data 310.

The computing device 300 comprises a feed operation routine 308 that includes computer readable instructions that when executed on the processor 390 of the computing device 300 removes a pending instance of the opportunity data 203 from the opportunity feed 304, generates an opportunity request 302, and/or receives a new instance of the opportunity data 203 and then either populates the open slot 303 with the new instance of the opportunity data 203 and/or adds the new instance of the opportunity data 203 to the opportunity feed 304 (e.g., regardless of whether the opportunity feed 304 utilizes the open slot 303 within the user interface when completing and/or removing the opportunity data 203, as described below).

Operation of the opportunity feed 304, including interactions of the user 101 with the opportunity feed 304, will now be described. In one or more embodiments, the server 200 may provide user 101 with a revolving list of tasks to complete as opportunities of the opportunity feed 304. For example, in one or more embodiments the selection algorithm 206 randomly selected businesses for the user 101 to make minimum purchases at (e.g., in the form of selecting one or more opportunity profiles 221 of the businesses). The user 101 may do so in order to gain additional and exclusive rewards that benefit the user 101. An opportunity that involves making a minimum purchase at a business is referred to as a purchase task, with the resulting transaction referred to as a purchase transaction made between the user profile 251 and the business profile 241. In one or more embodiments, opportunities on the opportunity feed 304 may be determined by administrators of the server 200 in collaboration with businesses that participate in the opportunity engagement network 100. In a non-limiting example, the opportunity profile 221 may be designed (e.g., selected by the selection algorithm 206) to increase the diversity of a spending habit of the user 101 by giving specific incentives to visit new businesses (e.g., to transact with new instances of the business profile 241) that the user 101 may never have visited. Administrators of the server 200 may also communicate with a business participating in the opportunity engagement network 100 to create certain opportunity profiles 221, such as trying a particular item on a menu of a business that is a restaurant. Thus, completion of an opportunity data 203 within the opportunity feed 304 may be viewed as a "payment" that the user 101 made in order to obtain the associated rewards 230.

Some potential rewards 230 for completing the opportunity data 203 may include receiving enhanced reward status 256 (including but not limited to a higher rewards rate) in exchange for completing the transaction and/or gaining tokens 232 that may be spent at any business with a business profile 241 in the opportunity engagement network 100. The tokens 232 may be used to achieve a higher rewards rate and/or enhanced rewards status 256 for a single transaction or redeemed in some other fashion to receive some other benefit. In one or more embodiments, points 231 may only be earned by a user 101 by completing a purchase transaction of an opportunity data 203 presented in their opportunity feed 304. In one or more embodiments, points 231 may be earned by a user 101 by making purchases at any business participating in the opportunity engagement network 100, but a user 101 may earn more points 231 per unit of money spent for completing opportunities with completion criteria 226 requiring completion of a purchase transaction. In one or more embodiments, the opportunity engagement network 100 may offer rewards or benefits of businesses that are only available to the users 101 of the opportunity engagement network 100. For example, completion of the opportunities in the opportunity feed 304 may result in a user 101 earning rewards 230 that are exclusive in terms of type, quantity, and/or quality 304 (e.g., a coupon, a voucher, an exclusive product or service), such that the rewards 230 offered through engagement with the opportunity feed 304 are nonequivalent to other rewards that a customer may be able to earn by making purchases at a business if such customer is not currently participating in the opportunity engagement network 100.

In one or more embodiments, a user 101 may have a pool of bonus points 234 that they can earn as the reward 230. In one or more embodiments, the bonus points 234 may not at first be accessible to the user 101 even as the bonus points 234 are building up in the rewards balance 253 of the user profile 251. The bonus points 234 may become available and/or convert to the points 231 if and when the user 101 completes a bonus condition, for example completing and/or removing a certain number of opportunities presented through the opportunity feed 304. Although not shown in the embodiment of FIG. 2, the bonus condition is data that may be specified in a database and may be communicated to the user 101. In one or more embodiments, the bonus points 234 may be earned in addition to the points 231, but differentiated based on their characteristic of being unavailable for use by the user 101 unless or until they complete the certain number of opportunities or other tasks. In one or more embodiments, the bonus points 234 may be rendered permanently unavailable for potential use (e.g., deleted) if the user 101 does not complete a certain number of opportunities within a certain period of time. In a non-limiting example, a user 101 may, for every transaction using the opportunity engagement network 100 at a participating business, have a first rate at which they earn points 231 and a separate rate at which they earn bonus points 234. Although the user 101 may be able to spend points 231 as soon as they earn them, the bonus points 234 associated with the user profile 251 may be unavailable for usage unless a certain number of opportunities are completed, for example, within one month completing ten instances of the opportunity data 203 presented on the opportunity feed 304. In such an example, if the user 101 does not complete the given number of opportunities, then, at the beginning of the next month, all bonus points 234 may be deleted from the user profile 251 and/or their balance of bonus points 234 may reset to zero. Continuing with the example, if the user 101 does complete all ten of the opportunities in their opportunity feed 304 by the end of the current month, then all of their bonus points 234 may be immediately "unlocked" and converted to the points 231 that the user 101 can spend at any time.

In one or more embodiments, the repopulation condition of the feed population ruleset 204 may be based on a time period. For example, at the end of a time period such as, without limitation, each month, all instances of the open slots 303 in the opportunity feed 304, such as those created by opportunities that were completed (e.g., the completion criteria 226 was met), may be replaced with new instances of the opportunity data 304 (e.g., as selected by the selection algorithm 206). Similarly, a number of new instances of the opportunity data 203 may be periodically added (e.g., five per week) independent of a current number of opportunity data 203 in the opportunity feed 304.

In one or more embodiments, the user 101 may use tokens 232 to remove an opportunity data 203 from the opportunity feed 304. The user 101 may have an incentive to use tokens 232 to remove an opportunity data 203 for the purpose of refilling that open slot 303 with a new opportunity data 203 for a next time period. In one or more embodiments, such a removal may prevent the potential issue of the opportunity feed 304 becoming full of instances of the opportunity data 203 representing opportunities the user 101 does not want to complete (e.g., which may involve businesses the user 101 may not want to visit). Where the opportunity feed 304 is full with opportunities the user 101 does not wish to complete, and/or has a large number of opportunities the user 101 does not wish to complete, it may prevent the user 101 from seeing new opportunities from appearing on the opportunity feed 304, including opportunities of new businesses that join the opportunity engagement network 100. A removal capability may also preserve the same incentives as other embodiments such as, but not limited to, an inherent sacrifice associated with not satisfying the completion criteria 226 of the opportunity data 203 because the user 101 will forego the enhanced reward status 256 (which may include the increased rewards rate) for the next time period that they may have had by completing an opportunity.

In one or more embodiments, the repopulation condition of the feed population ruleset 204 is the removal and/or completion of all opportunities on the opportunity feed 304. The feed population ruleset 204 may then specify that the entire opportunity feed 304 should be automatically repopulated. In a non-limiting example, if a user 101 has met the completion criteria 226 of eight out of ten opportunities (e.g., the opportunity data 203.1 through the opportunity data 203.8), the user 101 may use two instances of the token 232 to remove the remaining two instances of the opportunity data 203 (e.g., the opportunity data 203.9 and the opportunity data 203.10), submit the opportunity request 302, and receive ten new instances of the opportunity data 203.

In one or more embodiments, the user 101 may receive an increased rewards rate and/or enhanced reward status 256 for the next time period based on the number of opportunities that have been completed. In a non-limiting example, the user profile 251 may receive an additional 0.5% bonus to rewards 230 for each completed opportunity up to a maximum of 5% bonus in addition to receiving tokens 232, wherein the bonus rewards rate may be maintained for a time period (e.g., one month or for as long as some condition remains true). In another non-limiting example, there may be five different rewards tiers with a hierarchy based on an increasing quality and/or quantity of rewards 230, and completion of two opportunities presented as the opportunity data 203 in the opportunity feed 304 may result in the achievement of the next-level rewards tier (e.g., an increase reward status 256) for a time period.

In one or more embodiments, the opportunity may not be limited to businesses with a physical location. In one or more embodiments, opportunities involving web-based businesses may be placed on the opportunity feed 304. The completion criteria 226 may comprise an action the user 101 must complete such as, without limitation, signing up for services of the business profile 241 associated with the opportunity at a website of the business to complete (which may automatically remove) the opportunity data 203 in the opportunity feed 304 and receive the associated rewards 230. In one or more embodiments, the opportunity feed 304 may act as a method for directing customer traffic to "brick and mortar" businesses by requiring the user 101 to visit and complete a purchase transaction at a location (e.g., the location 225, the location 245). The opportunity feed 304 may also be used to direct user 101 activity of the user 101 and incentivize user behavior by providing the user 101 with rewards 230 for accomplishing tasks to meet the completion criteria 226 such as, without limitation, signing up for a service (e.g., a marketing list, a subscription service) and/or visiting a website.

In one or more embodiments, the selection algorithm 206 may make a selection based on their geographical location (e.g., a geospatial coordinate of the location 255 relative to the location 225 and/or the location 245). In a non-limiting example, if a user 101 moves from a first geospatial area 105A to a new geospatial location 105B, the opportunity feed 304 may be refreshed and may offer the user 101 new opportunities that may involve new businesses within the new geospatial area 105B. If the user 101 returns to the geospatial area 105A, the opportunity feed 304 may revert back to a previous list (e.g., may be repopulated from the saved feed 257 of the user profile 251) for the first geospatial area 105A, as illustrated in the process flow of FIG. 8. In one or more embodiments, opportunities that may be selected for inclusion in the opportunity feed 304 may be a result of the selection algorithm 206, where the selection algorithm 206 may be based on and/or influenced by criteria such as, but not limited to, a random selection, a set of customer spending habits (as may be stored in association with the user profile 251), customer interests stored in a customer interest data 258 (e.g., as may be determined from questionnaire and/or survey data 259 and/or other data derived from other customer activity), and/or purchased advertising space (e.g., purchased by a business to increase a likelihood that an opportunity profile 221 created by the business is selected, has opportunity data 203 extracted and transmitted to the computing device 300 of the user 101, and/or preferential placement on the opportunity feed 304). In one or more embodiments, the selection algorithm 206 may be based on a purely random selection process, or may be a random process filtered by geography, for example selecting opportunities and/or businesses for inclusion on an opportunity feed 304 of a user 101 based on a random selection of businesses located within set limits of the customer's geographic area (e.g., a geospatial area 105 and/or a radius from the location 255 of the computing device 300 of the user 101). In one or more embodiments, the selection algorithm 206 may take into account data such as the spending habits of the user 101, as may be stored in the opportunity history 254 and/or received from other data sources. In a non-limiting example, if the purchase history of the user 101 indicates a very high proportion of purchase transaction data being made at businesses that fall into the "clothing" category (e.g., the category 244), the selection algorithm 206 may elevate selection priority of opportunities and/or businesses that fall into the "clothing" category. In another non-limiting example, the opposite might even be true, where, for a particular user 101, the selection algorithm 206 might have a bias against selected (e.g., decreased probability of selecting) opportunity profiles 221 in the "clothing" category 244 so that the opportunity feed 304 functions to incentivize the user 101 to diversify their spending habits and/or expand the interests of the user 101 by spending at different categories 244 of business. In one or more embodiments, a business associated with a business profile 241 may be able to purchase featured advertising which may involve preferential selection by the selection algorithm 206 for inclusion on the opportunity feed 304, such as, without limitation, a doubled or tripled probability of being selected on any given opportunity feed 304 of a user 101 for a period of time.

In one or more embodiments, when an opportunity requiring a purchase transaction as a completion criteria 226 is currently presented in the opportunity feed 304, the user 101 may have the alternative option of purchasing credits 233 at the associated business in order to receive at least some of the rewards 230 associated with completion of the opportunity requiring the purchase transaction without actually having to make a store purchase. For example, an in-store purchase transaction may occur when the user 101 purchases (other than with credits 233) a good or service from a participating business. In one or more embodiments, credits 233 may be purchased and redeemed at cash-value. In a non-limiting example, a user 101 may purchase ten dollars ($10) in credits 233 at a business (e.g., have credits 233 stored in the user profile 251 of the user 101) and thereafter redeem the credits 233 for ten dollars ($10) in goods and services at that business. After credits 233 have been purchased, the credits 233 may then remain active for the user 101 to make purchases from the business.

In one or more embodiments, a user 101 may not receive any or all of the rewards 230 associated with completion of an opportunity data 203 by purchasing credits 233 in lieu of a purchase transaction for an actual good or service until the user 101 actually spends the credits 233 in order to purchase the actual good or service from the business. However, the user 101 may be able to receive some of the rewards 230 associated with completing the opportunity by purchasing credits 233. In a non-limiting example, a user 101 may purchase credits 233 at a business instead of completing an opportunity data 203 otherwise requiring a purchase transaction as the completion criteria 226 in order to increase a rewards rate and/or enhance a rewards status 256 for the next time period. However, the user 101 may not receive points 231, tokens 232, and/or other rewards 230 until the user 101 actually visits the business (whether a physical location or an online location) to make a purchase using the credits 233. In another non-limiting example, a user 101 may purchase credits 233 at a business in order to receive points 231 or tokens 233, but the user 101 may not receive an enhanced reward status 256 for the next time period until the user 101 engages in an actual purchase transaction with the business. However, in one or more embodiments, a user 101 may purchase credits 233 in order to receive the exact same rewards 230 they would have received if they would have made an actual purchase at that business. In one or more other embodiments, there may be a minimum purchase of credits 233 in order to remove an opportunity data 203 from the opportunity feed 304 and receive the rewards 230 associated with completion of opportunity feed 304.

In one or more embodiments, where the completion criteria comprises a purchase of credits 233 or engaging in a purchase transaction, purchase of more credits 233 may be required relative to a dollar-based purchase transaction for a good or service. This may serve to disincentivize a user 101 from purchasing credits 233 in lieu of making an actual purchase at the business for the good or service, while still giving the user 101 an alternative means of receiving the rewards 230 associated with opportunity data 203. In a non-limiting example, the user 101 may receive an opportunity data 203 on the opportunity feed 304 involving an auto body shop that offers oil changes, and with completion criteria 256 comprising a minimum purchase transaction of five dollars ($5). The user 101 may not currently need an oil change or anything else offered by this auto body shop, but the user 101 might still want to receive the rewards 230 associated with the opportunity data 203. The user 101 may therefore select the minimum purchase of credits 233 of twenty dollars ($20) to complete the opportunity despite a higher cost than five dollars ($5). In one or more embodiments, credits 233 may be "refunded" by being converted to points 231 if a business for which the credits 233 are associated leaves the opportunity engagement network 100 and/or goes out of business.

In one or more embodiments, there may be a notable difference between removing an opportunity data 203 from the opportunity feed 304 and completing it (e.g., meeting the completion criteria 226). In one or more embodiments, completion of an opportunity may automatically result in the removal of the opportunity data 203 of the opportunity from the opportunity feed 304. This may require that the user 101 complete other opportunities presented in the opportunity feed 304 in order to continue receiving rewards 233. In one or more embodiments, the user 101 may have the ability to remove opportunities from the opportunity feed 304 without completing the opportunity, although doing so may not result in any of the rewards 233 associated with meeting the completion criteria 226. However, a user 101 might still wish to remove an opportunity data 203 from their opportunity feed 304 for the sake of having it replaced with a new opportunity that the user 101 may find more desirable. In one or more embodiments, the user 101 may be able to expend tokens 232 in order to remove an opportunity data 203 from the opportunity feed 304 without completing (e.g., meeting the completion criteria 226) the opportunity so that it may be replaced (e.g., as decided by the feed population ruleset 204) with another task (e.g., as selected by the selection algorithm 206). In a non-limiting example, a user 101 may receive on the computing device 300 an opportunity data 203 that involves making a purchase at a business. The user 101 may have a strong objection to the business and/or the goods and services offered (e.g., a religious objection), but the user 101 may have the option of expending tokens 233 to remove the opportunity data 203 such that it will be replaced with another opportunity data 203 at the occurrence of the next repopulation condition. For example, the repopulation condition may be, without limitation, occurrence of the first day of the next calendar month. In one or more embodiments, opportunity data 203 in the opportunity feed 304 and any open slots 303 may be replaced automatically on a regularly scheduled interval. The user 303 may not be capable of removing opportunity data 203 from the opportunity feed 304 without either completing the opportunity according to a primary completion criteria 226 (e.g., engaging in a purchase transaction), or opting for the alternative that is the purchasing of credits 233 associated with the business. In one or more embodiments, the repopulation condition may be based on completing a threshold number of opportunity data 203 in the opportunity feed 304, a date (e.g., occurrence of a date), a geospatial location (e.g., entering a geospatial area), and completion of all opportunity data 203 in the opportunity feed 304.

In one or more embodiments, the opportunity engagement network 100 may not include the rewards status 256, the bonus points 234, and/or the credits 233. Such aspects of the present embodiments were used to illustrate general concepts associated with the opportunity feed 304 which can be applied in many different ways through many different embodiments, including arbitrary combinations of those embodiments described here, or alternative embodiments that have not been described here in any capacity. In one or more embodiments, the user 101 will not be able to arbitrarily remove and replace the opportunity data 203 on the opportunity feed 304 without any penalty, payment, and/or a waiting period (e.g., a period that must elapse before adding a new opportunity data 203 to the opportunity feed 304 and/or filling the open slot 303). Otherwise, the incentive for the user 101 to complete opportunities may be diminished given that the user 101 may simply remove opportunity data 203 at will and/or ad infinitum until, for example, the user 101 might receive opportunities that the user 101 already intended on completing, such as patronizing a certain business or purchasing a specific good or service. In one or more other embodiments, the feed population ruleset 204 may serve the opportunity data 203 based on data of the user profile 251, including but not limited to the location 245, the reward status 256, and interest data 258.

Figure 4:
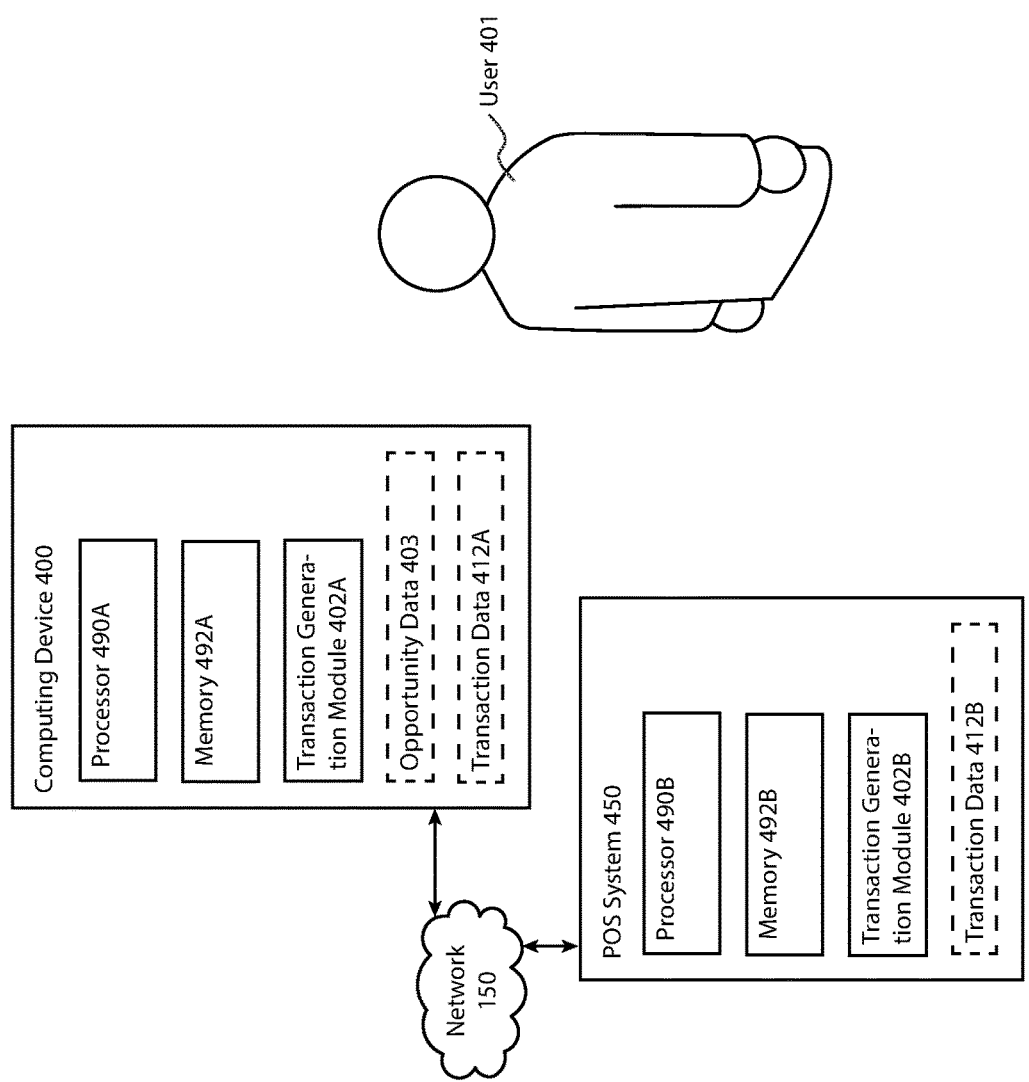
FIG. 4 illustrates a system of a computing device of a business and a POS system of the business for carrying out transaction processes, the system utilized by a second user who may be a business representative, including an opportunity data for generation of an opportunity profile in FIG. 2 and a transaction data generated upon completion of a transaction between the first user and the second user, according to one or more embodiments.

FIG. 4 illustrates a system of a computing device 400 of a business and a POS system 450 of the business for carrying out transaction processes, the system utilized by a user 401 who may be a business representative, including an opportunity data 403 for generation of an opportunity profile in FIG. 2 and a transaction data 412 (which may occur as the transaction data 412A and/or the transaction data 412B) generated upon completion of a transaction between the user 101 and the user 401, according to one or more embodiments. The computing device 400 may be, for example, a desktop computer, a tablet device, a mobile device, and/or a server computer. The POS system 450 may be a specialized piece of point-of-sale (POS) computing hardware connected to the server 200 and/or the computing device 400 through the network 150. Alternatively or in addition, the POS system may be a software application running on a computing device such as the computing device 400. In one or more embodiments, the computing device 400 and the POS system 450 may be implemented on the same physical machine.

The computing device 400 includes a processor 490A and a memory 492A. The user 401 may use the computing device 400 to input the opportunity data 403 (e.g., through an application, through a web interface, etc.) to be transmitted to the server 200 for creation of an associated opportunity profile 451. A transaction generation module 402A comprises computer readable instructions that when executed on the processor 490A generates the transaction data 412A. The transaction data 412A is data related to a transaction between a user profile 451 and a business profile 241. For example, the transaction data 412A may be linked with the API of a social media account of the business and determine the user 101 has provided a rating for the business which may be an aspect of the completion criteria 226 of an opportunity profile 221.

The POS system 450 may include a processor 490B and a memory 492B. A transaction generation module 402B may generate a transaction data 412B related to a purchase transaction between the user profile 451 and a business profile 241.

In one or more embodiments, the POS system 450 may allow for a user 101 to pay for their purchase at a participating business with physical cash while still being able to use and/or receive the rewards 230 for the purchase. In one example, the user 101 may access the user profile 251 using their mobile computing device (e.g., the computing device 300). The user 101 may select to record a payment for a transaction at the business and may input the transaction details. The user 101 may verify their identity and/or transaction details (e.g., via a PIN number or password and the authentication module 202). In one or more embodiments, the user 101 may be instructed to hand their mobile computing device to a clerk at the business (e.g., the user 401). The clerk may verify the identity of the user 101 and/or transaction details. The clerk may also be required to enter a security code such as, but not limited to, a business PIN. The transaction data 312 may then be generated by the computing device 300 and/or the transaction data 412 may then be generated by the computing device 400 and/or the POS system 450 (e.g., where separate, the transaction data 412A and/or the transaction data 412B, respectively).

In one or more embodiments, the POS system 450 and/or another networked terminal (e.g., the computing device 400 via the network 150) may have real time access to the server 200 where the clerk may approve a current transaction (e.g., a transaction data 312, a transaction data 412) of the user 101. For an opportunity requiring a purchase transaction, the server 200 may then determine if the completion criteria 226 has been met. Where the completion criteria 226 has been met, the opportunity may be completed and the user profile 251 of the user 101 may be updated with the reward 230, the user 101 may receive points 231, and/or other rewards 230. The business associated with the business profile 241 may be charged for any commission 228 associated with the transaction (e.g., as specified in the opportunity profile 221). In one or more embodiments, funds may be transferred to a third entity to be held until the business is scheduled to be paid for the purchase transaction. In a non-limiting example, the business may be paid every two weeks for all applicable transactions during the previous two-week time period.

In one or more embodiments, at a time of purchase, the user 101 may select a payment for a transaction at the business using earned points 231, and/or and use tokens 232 to increase the number of points 231 earned for the current transaction. In one or more embodiments, if the transaction amount is greater than the available points, the user 101 may select a second payment method for the remaining balance. The user 101 may also be able to make purchases and engage in other transactions to meet the completion criteria 226 directly on the computing device 300. For example, the user 101 may purchase credits 233 for a business where the user 101 may access their user profile 251 using their mobile device. This may occur where the user 101 utilizes the option of purchasing minimum credits 233 for the associated business in order to remove an opportunity data 203 from the opportunity feed 304.

Figure 5:
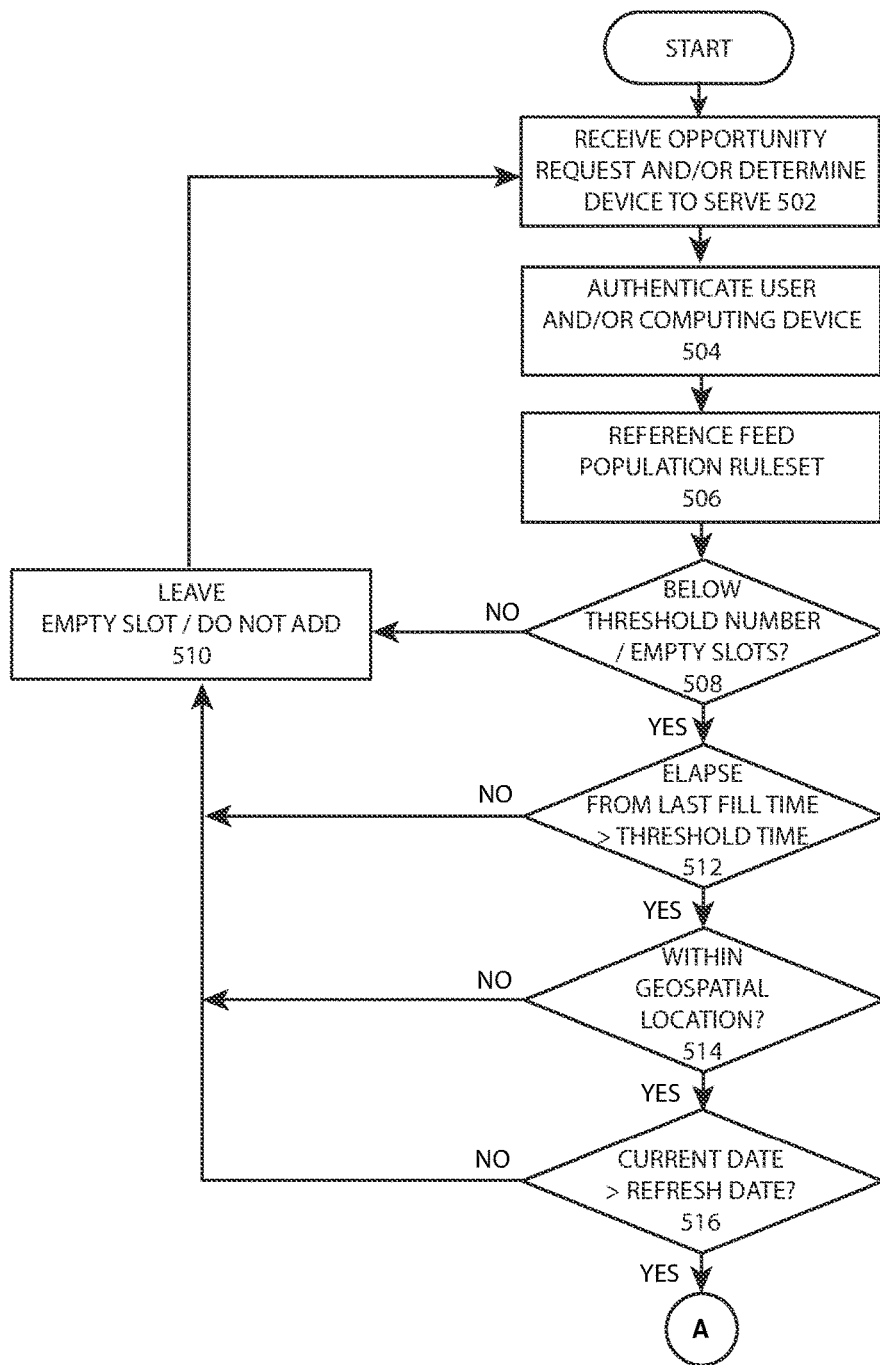
FIG. 5 illustrates an opportunity feed population process flow, according to one or more embodiments.

FIG. 5 illustrates an opportunity feed population process flow 550, according to one or more embodiments. Operation 502 receives an opportunity request 302 from the computing device 300 and/or determines a computing device 300 to serve with an opportunity data 203. The opportunity request 302 may be received by the server 200 over the network 150. The computing device 300 may be associated with a user profile 251 of the user 101. Operation 504 authenticates a user 101 and/or the computing device 300 associated with a user profile 251. The authentication of operation 504 may be effected by the authentication module 202. Operation 506 references a feed population ruleset 204. The feed population ruleset 204 determines based on one or more criteria whether one or more opportunity data 203 should be transmitted to the computing device 300. Operation 508, operation 512, operation 514, and operation 516 are example bases for the feed population ruleset 204, according to one or more embodiments.

Operation 508 determines, as an example of a repopulation condition, whether a number of opportunity data 203 currently in the opportunity feed 304 is below a threshold number of opportunity data 203 in the opportunity feed 304 (e.g., 5, 10, 100, 1000) and/or if one or more open slots 303 are present (in such case the opportunity feed 304 utilizes open slots 303). Where above the threshold number and/or there are no open slots 303 present in the opportunity feed 304, operation 508 proceeds to operation 510 in which case there is no action taken to pull additional opportunity data 203 and/or to fill the open slot 303. Otherwise, operation 508 proceeds to operation 512. Operation 512 determines, as an example of a repopulation condition, whether a threshold time has elapsed from when an opportunity data 203 was last added to the opportunity feed 304 and/or an open slot 303 has stayed open. If not, operation 512 proceeds to operation 510. Where the threshold time has elapsed from when an opportunity data 203 was last added to the opportunity feed 304 and/or an open slot 303 has stayed open, operation 512 proceeds to operation 514. In operation 514, if it is determined that the computing device 300 is within a certain geospatial area 105, then an opportunity data 203 is selected and transmitted (e.g., proceed to operation 516), whereas if the computing device 300 is not within the geospatial area 105 then operation 514 proceeds to operation 510. Operation 516 is a repopulation condition which determines whether a current date is greater than a refresh date. If not, operation 516 proceeds to operation 510. If the current date is greater than the refresh date, operation 516 continues to operation 600 of FIG. 6. The re-population conditions shown in FIG. 5 are examples and not limiting. For example, in one or more alternate embodiments operation 506 may proceed to operation 514, and operation 514 may proceed to the process flow of FIG. 6.

Figure 6:
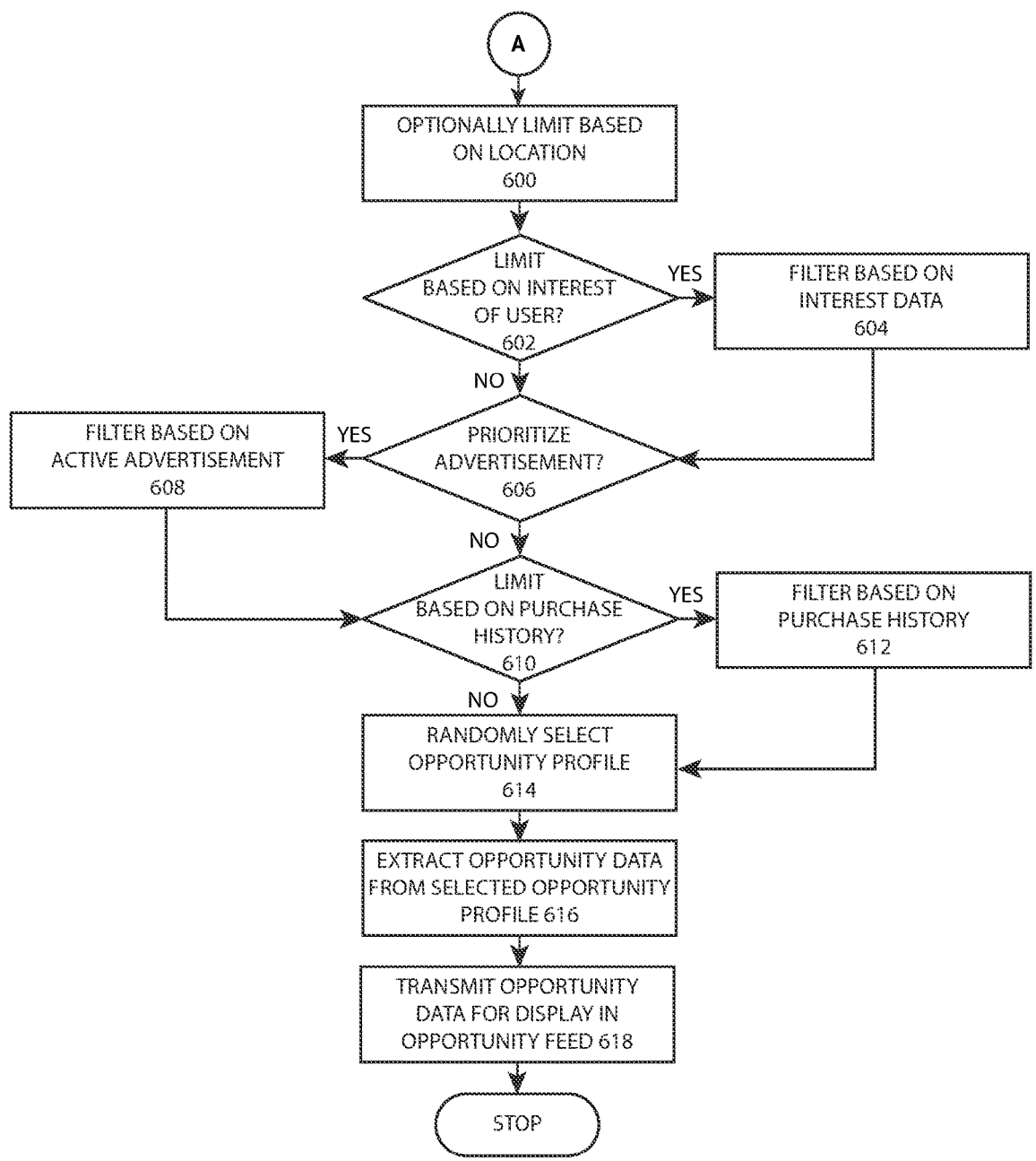
FIG. 6 illustrates an opportunity data selection process flow, according to one or more embodiments.

FIG. 6 illustrates an opportunity data selection process flow 650, according to one or more embodiments. Operation 600 optionally limits a selection based on a geospatial location of the computing device 300 and/or the geospatial location of a location of the user 101 (e.g., the location 225). For example, in one or more embodiments, only opportunities within the geospatial area 105 that may be centered on the computing device 300 of the user 101 are used to form a reduced dataset from which a selection is made. Operation 602 determines whether the selection should be based on an interest of the user 101, in which case operation 604 filters based on an interest data 258 of the user 101 (e.g., as stored in the user profile 251 of the user 101, and as may be collected through a questionnaire and/or a survey). If operation 602 is not based on an interest of the user 101, operation 602 proceeds to operation 606. Operation 606 determines whether a selection of an opportunity should be based on an advertisement and/or whether to prioritize an advertisement. The advertisement may be specified in an advertisement data stored on the server 200. For example, a business may have set up the opportunity profile 221 with a commission 228 and/or a relatively high commission 228 relative to other opportunity profiles 221 such that the opportunity data 203 of the opportunity profile 221 is considered advertising and transmitted to the computing device 300 and displayed on the opportunity feed 304. If advertising is to be a factor, operation 606 proceeds to operation 608 which may filter based on an active advertisement (e.g., instances of the opportunity profile 221 comprising and/or associated with an advertisement data). In either case, operation 606 and operation 608 proceed to operation 610. Operation 610 determines whether selection should be limited based on a purchase history of the user profile 251 (e.g., selection based on "diverse" goods and services dissimilar to those previously purchased by the user 101, a selection based on goods and services not similar, or "diverse" from those previously purchased by the user 101), in which case operation 610 proceeds to operation 612 which filters based on the purchase history. A dataset of instances of the opportunity profile 221 for selection may result. Operation 610 and operation 612 then proceed to operation 614.

Operation 614 randomly selects an opportunity profile 221 from the dataset of instances of the opportunity profile 221 for selection. In one or more other embodiments, a prioritized advertisement may adjust a probability of being selected within operation 614. A selected opportunity profile 221 may be identified by the opportunity profile ID 222, which may be used to retrieve the opportunity data 203 from the opportunity database 220. Operation 618 transmits the opportunity data 203 over the network 150 for display in the opportunity feed 304.

Figure 7:
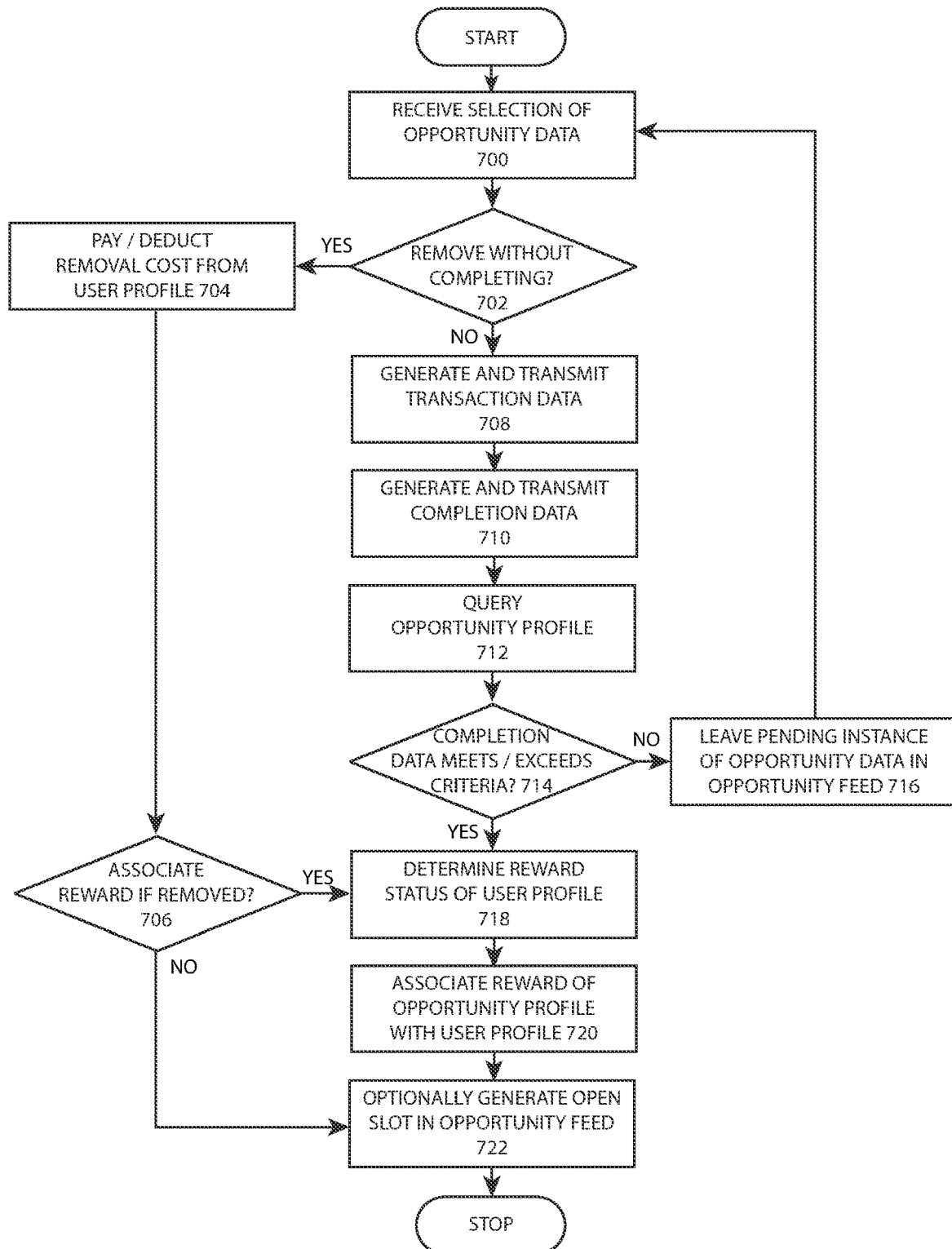
FIG. 7 illustrates an opportunity completion process flow, according to one or more embodiments.

FIG. 7 illustrates an opportunity completion process flow 750, according to one or more embodiments. Operation 700 receives a selection of an opportunity data 203 presented in the opportunity feed 304. For example, the user 101 may select an instance of the opportunity data 203 within the opportunity feed 304 on a user interface of the mobile device of the user 101. Operation 702 determines whether the opportunity data 702 is to be removed from the opportunity feed 304 without completion (e.g., where completion is qualifying for the completion criteria 226 through one or more acts other than paying a removal cost 227). However, in one or more embodiments, operation 702 is bypassed if no removal option is available. If the opportunity data 203 is to be removed, operation 702 proceeds to operation 704 which deducts the removal cost 227 from the user profile 251 and/or charges the user profile 251 for purchasing credits 233, depending on the removal cost 227. Operation 704 then proceeds to operation 706 which determines whether to associate the reward 230 of the opportunity profile 221 if the opportunity data 203 was removed from the opportunity feed 304 without completion of the opportunity. However, in one or more embodiments, operation 704 and 706 are inapplicable if no removal option is available. Where rewards 230 are still to be gained for removal, operation 706 then proceeds to operation 718. Otherwise, operation 706 proceeds to operation 722, as described below.

Where the user 101 does not select the opportunity 203 for removal, operation 702 proceeds to operation 708. Operation 708 generates a transaction data (e.g., the transaction data 212, the transaction data 312, and/or the transaction data 412) alone or in combination evidencing the completion criteria 226. For example, the transaction data 312 and the transaction data 412 may each be generated for a purchase transaction. Similarly, the transaction data 312 may be generated by the computing device 300 and the transaction data 212 may be generated by the server 200 when the user 101 is determined to have reached a certain geospatial location (e.g., the location 225) as part of the completion criteria 226. In another example, the transaction may be a social media transaction such as a Facebook® account of the user 101 posting on the Facebook® page of the business. Operation 710 generates and transmits an opportunity completion data 310 specifying an instance of the opportunity data 203 which is complete. The opportunity completion data 310 may include the opportunity profile ID 222. The opportunity completion data 310 may be generated by the computing device 300 and transmitted over the network 150 to the server 200. Operation 712 queries the opportunity profile 221, for example with the opportunity profile ID 222.

Operation 714 determines whether the opportunity completion data 310 meets and/or exceeds the completion criteria 226. If the opportunity completion data 310 does not meet and/or exceed the completion criteria 226, operation 714 proceeds to operation 716 which may leave a pending instance of the opportunity data 203 in the opportunity feed 304. Where the completion criteria 226 is met and/or exceeded, operation 714 proceeds to operation 718. Operation 718 determines a reward status 256 of the user profile 251 of the user 101, for example a "Silver" reward status 256. Operation 720 associates the reward 230 of the opportunity profile 221 of the opportunity data 203 with the user profile 251, for example as a value of the reward balance 253. The reward 230 may be enhanced and/or multiplied by the reward status 256 determined in operation 718. Operation 722 optionally creates an open slot 303 in the opportunity feed 304 in such case open slots 303 are displayed, which may in one or more embodiments optionally be used to encourage completion of more opportunities to trigger a refill event, in such case that the opportunity feed 304 utilizes open slots 303. In one or more embodiments, operation 722 may then initiate the opportunity request 302 and proceed to operation 500 of FIG. 5.

Figure 8:
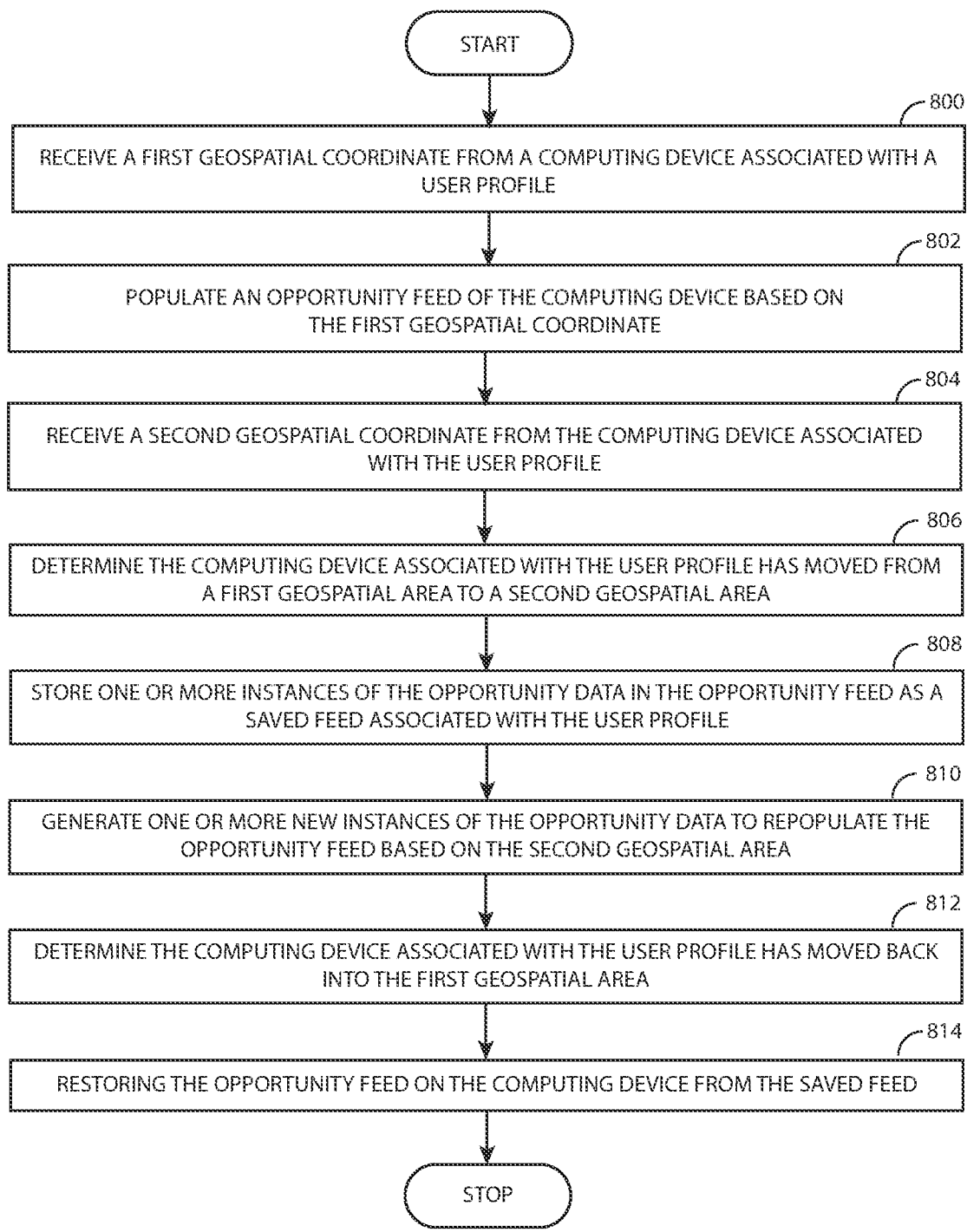
FIG. 8 illustrates a geospatial opportunity feed process flow, according to one or more embodiments.

FIG. 8 illustrates a geospatial opportunity feed process flow 850, according to one or more embodiments. Operation 800 receives a first geospatial coordinate from a computing device 300 associated with a user profile 251 (e.g., as may be generated by the GPS unit 394 and stored as the location 255A). At the time of generation of the first geospatial coordinate, the opportunity feed 304 may comprise, for example, an opportunity data 203A.1 through an opportunity data 203A.10. Operation 802 populates an opportunity feed 304 of the computing device 300 based on the first geospatial location. Operation 804 receives a second geospatial coordinate from the computing device 300 associated with the user profile 251 (e.g., as may be generated by the GPS unit 394 and stored as the location 255B). Operation 806 determines the computing device 300 associated with the user profile 251 has moved from a first geospatial area 105 to a second geospatial area 105. For example, the user 101, as detected from the new position of the computing device 300, may have moved from a first city to a second city. Operation 808 stores one or more instances of the opportunity data 203 in the opportunity feed 304 as a saved feed 257 associated with the user profile 251. For example, operation 808 may store each of one or more instances of the opportunity profile ID 222. Operation 810 generates one or more new instances of the opportunity data 203 (e.g., an opportunity data 203B.1 through an opportunity data 203B.10) to repopulate the opportunity feed 304 based on the second geospatial area 105B.

The user 101 may then engage with the opportunity data 203B.1 through an opportunity data 203B.10. Operation 812 then determines that the computing device 300 associated with the user profile 251 has moved back into the first geospatial area 105A. Operation 814 then restores the opportunity feed 304 on the computing device 300 from the saved feed 257, for example by reading each opportunity profile ID 222 from the saved feed 257 and re-extracting the opportunity data 203A.1 through the opportunity data 203A.10 from the opportunity database 220.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "one or more embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, one or more embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "processor" may refer to any device or portion of a device that processes electronic data from registers and/or memory to transform that electronic data into other electronic data that may be stored in registers and/or memory. A "computing platform" may comprise one or more processors.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing the opportunity engagement network 100 according to the present invention will be apparent to those skilled in the art. Various aspects of the invention have been described above by way of illustration, and the specific embodiments disclosed are not intended to limit the invention to the particular forms disclosed. The particular implementation of the loyalty rewards programs may vary depending upon the particular context or application. By way of example, and not limitation, the loyalty rewards programs described in the foregoing were principally directed to user engagement based on a revolving opportunity feed delivering rewards of a business profile based on completion criteria; however, similar techniques may instead be applied to marketplaces that interact on the Internet, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. A method comprising:
   authenticating at least one of a user associated with a user profile and a computing device associated with the user profile;
   receiving an opportunity request from the computing device associated with the user profile,
      wherein the user profile comprising at least one of a user profile ID, a reward balance, a reward status, an opportunity history and a past activity of the user;
   selecting an opportunity profile from which to transmit an opportunity data to the computing device,
      wherein the opportunity profile comprising an opportunity completion criteria and data specifying a reward for completion of the opportunity completion criteria;
   extracting the opportunity data from the opportunity profile,
      wherein the opportunity data comprising at least one of an opportunity profile ID and the opportunity completion criteria;
   transmitting the opportunity data to the computing device over a network;
   receiving a completion data and the opportunity profile ID;
   validating the completion data by comparing the completion data to the opportunity completion criteria of the opportunity profile;
   determining the completion data meets the opportunity completion criteria;
   executing computer readable instructions to provide the reward to the user; and
   writing within a database data designating that the user profile ID completed the opportunity completion criteria associated with the opportunity profile ID.

2. The method of claim 1, further comprising:
   receiving a new opportunity request from the computing device associated with the user profile, and
   selecting a new opportunity profile from which to transmit a new opportunity data to the computing device,
      wherein the new opportunity profile is selected based on criteria comprising completion of the opportunity profile within an opportunity history.

3. The method of claim 2, further comprising:
modifying the reward based on the reward status associated with the user profile,
wherein the opportunity data is transmitted to the computing device over the network for display in an opportunity feed; and
referencing a feed population ruleset to determine an addition to the opportunity feed based on at least one of a date, an activity history of the user, and a geospatial location of the computing device.

4. The method of claim 3,
wherein the completion data comprising a transaction data generated by a transaction between the user associated with the user profile and a second user associated with a second user profile,
wherein the opportunity profile selected is associated with a business profile, and
wherein the second user is a business user and the second user profile is the business profile.

5. The method of claim 4, further comprising:
receiving a geospatial coordinate from the computing device associated with the user profile;
determining, based on the geospatial coordinate, the computing device associated with the user profile has moved from a first geospatial area to a second geospatial area;
storing one or more instances of the opportunity data in the opportunity feed as a saved feed; and
adding one or more new instances of the opportunity data to the opportunity feed based on movement into the second geospatial area.

6. The method of claim 5, further comprising:
determining the computing device associated with the user profile has moved back into the first geospatial area; and
restoring the opportunity feed from the saved feed.

7. The method of claim 6,
wherein the reward comprises at least one of a point usable in association with a different transaction between the user profile and the business profile, a credit spendable at cash value, a physical currency, a digital currency, a credit usable in association with the different transaction between the user profile and the business profile, a token usable to modify a pending instance of the opportunity data in the opportunity feed for the user to achieve a higher reward status, and a discount on at least one of a product and a service.

8. The method of claim 7,
wherein executing the computer readable instructions to provide the reward to the user comprising steps of referencing the reward in the opportunity profile and associating the reward with the user profile,
wherein the transaction is at least one of a social media transaction, a purchase transaction, and a marketing transaction,
wherein a selection of the opportunity profile based on criteria comprising at least one of a random process, the past activity of the user, the opportunity history, and a purchase data of the user profile,
wherein the reward further comprises at least one of a voucher, a coupon, a free product, and a free service, and
wherein the business profile comprising at least one of a name, a geospatial location associated with the business profile, a category of a business associated with the business profile, and a business data.

9. A device comprising:
a processor;
a memory;
an authentication module comprising computer readable instructions that when executed on the processor authenticate at least one of a credential of a user associated with a user profile and a computing device associated with the user;
a set of computer readable instructions that when executed on the processor:
select an opportunity profile from which to transmit an opportunity data to the computing device,
wherein the opportunity profile comprising an opportunity profile ID, an opportunity completion criteria for completion of one or more tasks, and data specifying a reward for completion of the opportunity completion criteria,
transmit the opportunity data to the computing device over a network for display on the computing device of the user,
receive a completion data comprising a user profile ID and the opportunity profile ID, the completion data generated upon completion of the one or more tasks,
query the opportunity profile, and
extract the opportunity completion criteria; and
a completion criteria engine comprising computer readable instructions that when executed on the processor:
validate the completion data associated with the user profile ID by comparing the completion data to the opportunity completion criteria,
write within a database data designating that the user profile ID completed the opportunity completion criteria associated with the opportunity profile ID, and
provide the reward to the user.

10. The device of claim 9, wherein the device further comprising:
a set of computer readable instructions that when executed receive a new opportunity request from the computing device associated with the user profile, and
a selection algorithm selecting a new instance of the opportunity profile select a new opportunity profile from which to transmit a new opportunity data to the computing device,
wherein the new opportunity profile is selected based on criteria comprising completion of the opportunity profile within an opportunity history.

11. The device of claim 10, further comprising:
an opportunity database comprising the opportunity profile,
wherein the opportunity profile comprising at least one of the opportunity completion criteria, a status requirement, and the reward.

12. The device of claim 11, further comprising computer readable instructions that when executed:
determine a reward status associated with the user profile; and
modify the reward based on the reward status associated with the user profile when associating the reward with the user profile.

13. The device of claim 12,
wherein executing the computer readable instructions to provide the reward to the user comprising steps of referencing the reward in the opportunity profile and associating the reward with the user profile,
wherein the completion data comprising a transaction data generated by a transaction between the user profile and a business profile, and wherein the transaction comprising at least one of a financial transaction, a purchase transaction, a social media transaction, and a marketing transaction.

14. The device of claim 10, further comprising:
a selection algorithm selecting a new instance of the opportunity profile based on a geospatial coordinate, wherein a new opportunity is offered to the user upon entering a new geospatial area associated with the geospatial coordinate.

15. A system comprising:
a server comprising:
   a processor of the server,
   an opportunity profile comprising an opportunity profile ID, an opportunity completion criteria, and a reward for completion of the opportunity completion criteria;
   an authentication module comprising computer readable instructions that when executed on the processor authenticate at least one of a user and a computing device associated with a user profile of the user;
   a selection algorithm comprising computer readable instructions that when executed on the processor of the server determine an opportunity data of the opportunity profile to transmit to the computing device;
   a memory of the server comprising computer readable instructions that when executed on the processor:
      extract the opportunity data comprising the opportunity completion criteria and the reward from the opportunity profile, and
      transmit the opportunity data to the computing device associated with the user profile for display on the computing device,
   a completion criteria engine comprising computer readable instructions that when executed on the processor of the server:
      validate a completion data associated with a user profile ID by comparing the completion data to the opportunity completion criteria of the opportunity profile,
      write within a database data designating that the user profile ID completed the opportunity completion criteria associated with the opportunity profile ID, and
      provide the reward to the user; and
a network.

16. The system of claim 15, wherein the computing device associated with the user is a mobile device comprising:
a display screen of the mobile device;
a processor of the mobile device;
a memory of the mobile device comprising an opportunity feed,
   wherein the opportunity feed further comprising one or more instances of the opportunity data presentable on the display of the mobile device through an application;
a feed operation routine comprising computer readable instructions that when executed on the processor of the mobile device:
   generate an opportunity request,
   receive a new instance of the opportunity data, and
   add the new instance of the opportunity data to the opportunity feed; and
a completion generation routine comprising computer readable instructions that when executed on the processor of the mobile device:
   generate the completion data comprising the opportunity profile ID.

17. The system of claim 16, further comprising:
a different computing device associated with a business profile, comprising:
   a processor of the different computing device;
   a memory of the different computing device comprising computer readable instructions that when executed on the processor of the different computing device generate the opportunity data for inclusion in the opportunity profile; and
   a first transaction generation module comprising computer readable instructions that when executed on the processor of the different computing device generate a first transaction data associated with a first transaction between the user profile and the business profile.

18. The system of claim 17, further comprising:
a POS system comprising:
   a processor of the POS system;
   a memory of the POS system; and
   a second transaction generation module comprising computer readable instructions that when executed on the processor of the POS system generate a second transaction data of a purchase transaction between the user profile and the business profile,
      wherein the server further comprising a business database comprising a business profile ID, a business data, and the opportunity profile ID.

19. The system of claim 18,
wherein the completion criteria engine further comprising computer readable instructions that when executed on the processor of the server:
   designate a completed instance of the opportunity data associated with the user profile ID,
   receive at least one of the first transaction data generated by the first transaction between the user profile and the business profile and the second transaction data generated by the purchase transaction between the user profile and the business profile, and
   determine the opportunity completion criteria comprising at least one of the first transaction between the user profile and the business profile and the purchase transaction,
wherein the first transaction comprising at least one of a financial transaction, a social media transaction, and a marketing transaction,
wherein the opportunity data comprising at least one of the opportunity profile ID, the business profile ID, the opportunity completion criteria, and a geospatial location associated with an opportunity, and
wherein the business profile comprising at least one of a name, a geospatial location associated with the business profile, a category of a business associated with the business profile, and the business data.

20. The system of claim 19, further comprising:
a consumer database comprising the user profile, wherein the user profile comprising the user profile ID, a reward balance, and at least one of an opportunity history, a past activity of the user, a purchase history, a reward status, and a saved feed, and
a set of computer readable instructions that when executed receive a new opportunity request from the computing device associated with the user profile, and
   wherein the selection algorithm selects a new opportunity profile from which to transmit a new opportunity data to the mobile device based on criteria comprising completion of the opportunity profile within the opportunity history.

\* \* \* \* \*